US012675915B2

(12) United States Patent
Tocze et al.

(10) Patent No.: US 12,675,915 B2
(45) Date of Patent: Jul. 7, 2026

(54) METHOD, DEVICE, AND COMPUTER PROGRAM FOR IMPROVING RANDOM ACCESS IN POINT CLOUD DATA BIT-STREAM

(71) Applicant: CANON KABUSHIKI KAISHA, Tokyo (JP)

(72) Inventors: Lionel Tocze, Saint Domineuc (FR); Franck Denoual, Saint Domineuc (FR); Frédéric Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 206 days.

(21) Appl. No.: 18/637,143

(22) Filed: Apr. 16, 2024

(65) Prior Publication Data

US 2024/0346698 A1     Oct. 17, 2024

(30) Foreign Application Priority Data

Apr. 17, 2023   (GB) ..................................... 2305636
Jul. 10, 2023   (GB) ..................................... 2310561

(51) Int. Cl.
*G06T 9/00*        (2006.01)
*H04N 19/68*       (2014.01)
*H04N 19/70*       (2014.01)

(52) U.S. Cl.
CPC ............... *G06T 9/00* (2013.01); *H04N 19/68* (2014.11); *H04N 19/70* (2014.11)

(58) Field of Classification Search
CPC .......... G06T 9/00; H04N 19/68; H04N 19/70; H04N 19/597; H04N 21/234309; H04N 21/440218; H04N 21/234318; H04N 21/2343; H04N 21/2353; H04N 21/23605; H04N 21/23614; H04N 21/2362; H04N 21/4343; H04N 21/4348; H04N 21/4402; H04N 21/84; H04N 21/845; H04N 21/8455; H04N 21/8454; H04N 21/85406
See application file for complete search history.

(56) References Cited

U.S. PATENT DOCUMENTS

| | | | | |
|---|---|---|---|---|
| 11,418,812 B2 * | 8/2022 | Wang | ............... | H04N 21/85406 |
| 2020/0381022 A1 * | 12/2020 | Ilola | .................... | G11B 27/102 |

(Continued)

FOREIGN PATENT DOCUMENTS

| | | | | |
|---|---|---|---|---|
| EP | 4072139 A2 | 10/2022 | | |
| EP | 4557739 A1 * | 5/2025 | ........... | H04N 21/816 |
| WO | 2021/211665 A1 | 10/2021 | | |

*Primary Examiner* — William Spieler
(74) *Attorney, Agent, or Firm* — Canon U.S.A., Inc. IP Division

(57) ABSTRACT

According to some embodiments of the disclosure, it is provided a method for encapsulating point cloud data into an ISOBMFF-based media file, the point cloud data being organized in point cloud frames. After having generated a track describing a sequence of samples, each sample comprising at least one point cloud frame, the sequence of samples comprising at least one sync sample and a plurality of non-sync samples, at least one non-sync sample of the plurality of non-sync samples comprising a parameter set, and after having generated metadata describing whether a non-sync sample of the plurality of non-sync samples requires, to be decoded, a parameter set from another non-sync sample of the non-sync samples, the track and the metadata are encapsulated in the media file.

20 Claims, 8 Drawing Sheets

(56) References Cited

U.S. PATENT DOCUMENTS

| | | | | |
|---|---|---|---|---|
| 2021/0005016 A1* | 1/2021 | Oh | ........................ | G06T 9/001 |
| 2021/0029187 A1* | 1/2021 | Oh | ........................ | H04L 65/70 |
| 2021/0105492 A1 | 4/2021 | Aksu | | |
| 2021/0209806 A1* | 7/2021 | Oh | ........................ | G06T 19/00 |
| 2021/0209807 A1* | 7/2021 | Oh | ...................... | H04N 21/816 |
| 2021/0217200 A1* | 7/2021 | Oh | ........................ | G06T 17/00 |
| 2021/0218947 A1* | 7/2021 | Oh | ........................ | G06T 9/001 |
| 2021/0227232 A1* | 7/2021 | Oh | .................... | H04N 21/4728 |
| 2021/0295567 A1* | 9/2021 | Lee | ........................ | G06T 9/001 |
| 2021/0320962 A1 | 10/2021 | Oh | | |
| 2021/0409767 A1* | 12/2021 | Oh | .................. | H04N 21/85406 |
| 2022/0060529 A1* | 2/2022 | Oh | ...................... | H04N 13/194 |
| 2023/0059516 A1 | 2/2023 | Schwarz | | |
| 2023/0188751 A1 | 6/2023 | Hamza | | |
| 2023/0281923 A1 | 9/2023 | Gudumasu | | |
| 2025/0056049 A1* | 2/2025 | Denoual | ................ | H04N 19/46 |

\* cited by examiner configuring the file reader — 500 starting decoding from sample X — 505 yes / self-contained sample? \ no — 510 determining the requested parameter set — 520 determining the samples containing the parameter sets — 525 extracting the parameter set data units from the determined samples — 530 decoding the sample — 515 yes / remaining samples? \ no → end — 535

METHOD, DEVICE, AND COMPUTER PROGRAM FOR IMPROVING RANDOM ACCESS IN POINT CLOUD DATA BIT-STREAM

CROSS REFERENCE TO RELATED APPLICATION

This application claims the benefit under 35 U.S.C. § 119 (a)-(d) of United Kingdom Patent Application No. 2305636.9, filed on Apr. 17, 2023 and of United Kingdom Patent Application No. 2310561.2, filed on Jul. 10, 2023, both entitled "METHOD, DEVICE, AND COMPUTER PROGRAM FOR IMPROVING RANDOM ACCESS IN POINT CLOUD DATA BIT-STREAM". The above cited patent applications are incorporated herein by reference in their entirety.

FIELD OF THE DISCLOSURE

The present disclosure relates to encapsulation and parsing of data, in particular of point cloud data such as a G-PCC bit-stream, in a standard and interoperable format, to make it possible to identify and locate parameter sets, improving random access decoding.

BACKGROUND OF THE DISCLOSURE

The Moving Picture Experts Group (MPEG) is standardizing the compression and storage of point cloud data (also denoted volumetric media data) information. Point cloud information consists in sets of 3D points with associated attribute information such as color, reflectance, and frame index.

On the first hand, MPEG-I Part-9 (ISO/IEC 23090-9) specifies Geometry-based Point Cloud Compression (G-PCC) and specifies a bit-stream syntax for point cloud information. According to MPEG-I Part-9, a point cloud is an unordered list of points comprising geometry information, optional attributes, and associated metadata. Geometry information describes the location of the points in a three-dimensional Cartesian coordinate system. Attributes are typed properties of each point, such as color or reflectance. Metadata represent items of information used to interpret the geometry information and the attributes. The G-PCC compression specification (MPEG-I Part-9) defines specific attributes like frame index attribute or frame number attribute, with a reserved attribute label value (3 to indicate a frame index and 4 to indicate a frame number attribute), being recalled that according to MPEG-I Part-9, a point cloud frame is set of points at a particular time instance.

On the second hand, MPEG-I Part-18 (ISO/IEC 23090-18) specifies a media format that makes it possible to store and to deliver geometry-based point cloud compression data. It is also supporting flexible extraction of geometry-based point cloud compression data at delivery and/or decoding time. According to MPEG-I Part-18, the point cloud frames are encapsulated in one or more G-PCC tracks as timed samples, a sample in a G-PCC track corresponding to a single point cloud frame. Each sample comprises one or more G-PCC units which belong to the same presentation time. A G-PCC unit, also referred to as a data unit, is one type-length-value (TLV) encapsulation structure containing at least one of a Sequence Parameter Set (SPS), a Geometry Parameter Set (GPS), an Attribute Parameter Set (APS), a tile inventory, a frame boundary marker, a Geometry Data Unit (GDU), an attribute data unit (ADU), a defaulted attribute data unit, a frame-specific attribute property (FSAP) data unit, and a user-data data unit. The syntax of TLV encapsulation structure is defined in Annex B of ISO/IEC 23090-9:

a Sequence Parameter Set (SPS) data unit contains information relative to general parameters for encoding and decoding the bit-stream sequence. There may be several configurations of SPS, each one being uniquely identified by the sps_seq_parameter_set_id field contained in each SPS;

a Geometry Parameter Set (GPS) data unit contains parameters describing how encoding and decoding a position (also denoted a geometry) of a point of the point cloud. There may be several configurations of GPS, each one being uniquely identified by the gps_geom_parameter_set_id field contained in each GPS. The GPS also refers to the global SPS parameter used for encoding and decoding, using the gps_seq_parameter_set_id field;

an Attribute Parameter Set (APS) data unit contains parameters describing how encoding and decoding specific characteristics of a point of the point cloud, also denoted attributes, such as the reflectance, the type of material, etc. There may be several configurations of APS, each one uniquely identified by the aps_attr_parameter_set_id field contained in each APS. The APS also refers to the global SPS parameter used for encoding and decoding, using the aps_seq_parameter_set_id field;

a Geometry Data Unit (GDU) contains encoded information representing points positions in the point cloud. A GDU refers to the configuration used for encoding and decoding point positions, using the gdu_geometry_parameter_set_id field contained in each GDU; and an Attribute Data Unit (ADU) contains encoded information representing the attributes of points in the point cloud. An ADU refers to the configuration used for encoding and decoding specific point characteristics by the adu_attr_parameter_set_id field contained in each ADU. An ADU also identifies the coded attribute by its index into the active SPS attribute list, using the adu_attr_parameter_set_id field.

At any time, only one SPS, GPS, and APS is active in a G-PCC encoder or decoder.

A GPS is activated once a GDU contains a gdu_geometry_parameter_set_id field sets to the gps_geom_parameter_set_id value. This also activates the SPS, which sps_seq_parameter_set_id value is set in the gps_seq_parameter_set_id field. Likewise, An APS is activated once an ADU contains an adu_attr_parameter_set_id field sets to the value aps_attr_parameter_set_id value.

According to ISO/IEC 23090-18 document and its AMD1 amendment:

a G-PCC sample is a sample comprising a set of G-PCC units (corresponding to TLV encapsulation structures). When a G-PCC bit-stream is carried in a single track, each sample contains at least one G-PCC unit containing geometry data unit (GDU), zero or more G-PCC units containing attribute data units (ADUs), and zero or more G-PCC units carrying parameter sets (SPS/ GPS or APS). When a G-PCC bit-stream is carried in multiple tracks per G-PCC component, each G-PCC component bit-stream is mapped to an individual G-PCC component track. A G-PCC component track is either a G-PCC geometry track or a G-PCC attribute track. Each G-PCC sample in a G-PCC component track contains at least one G-PCC unit carrying data units of a single G-PCC component, not both of geometry and attribute data units or multiplexing of different attribute data units;

a sync sample is a sample that satisfies all the following conditions:

it is independently decodable;

none of the samples that come after the sync sample (in decoding order) has any decoding dependency on any sample prior to the sync sample;

all the samples that come after the sync sample (in decoding order) are successfully decodable.

it contains the parameter set(s) required to decode the sample either in the sample or in the sample entry.

It is observed that ISOBMFF standard (ISO/IEC 14496-12) provides specific boxes, e.g., SyncSampleBox ('stss'), TrackRunBox or ('trun'), TrackFragmentRandomAccess-Box ('tfra') to signal that a sample is a sync sample, from where access to the track may be processed without any error. In other words, the samples signaled as sync samples make it possible to obtain a decodable bit-stream from any of these signaled samples, enabling random access from any of these samples. In the case of G-PCC, this means that the all parameter set(s) required by the sample used as a random access are present in the sample itself or in an associated sample entry.

FIGS. 1a and 1b, illustrate an example of G-PCC bit-stream and of a corresponding encapsulated G-PCC bit-stream, respectively FIG. 1a illustrates a G-PCC bit-stream (or sequence) 100 as provided by a G-PCC encoder. For the sake of illustration, bit-stream 100 comprises the samples 105-1, 105-2, 105-n, 105-m, and 105-o.

Sample 105-1 comprises several parameter sets (respectively SPS 105-10, GPS0 105-11 (with gps_geom_parameter_set_id=0), and APS0 105-12 (with aps_attr_parameter_set_id=0)), followed by one GDU 105-13 and one ADU 105-14. GDU 105-13 and ADU 105-14 activate respectively the use of GPS0, SPS and APS0. According to the illustrated example, sample 105-1 may be seen as a self-decodable sample (since it is independently decodable) and a self-contained sample (since it comprises all parameter sets required by the GDU 105-13 and the ADU 105-14), that is signaled as a sync sample.

Sample 105-2 comprises one GDU 105-23 and one ADU 105-24. GDU 105-23 refers to GPS0. Sample 105-2 may be a self-decodable sample or a non-self-decodable sample, but it cannot be a sync sample since it depends on parameter sets of another sample.

As illustrated, sample 105-n comprises a parameter set GPS1 105-n1 (with gps_geom_parameter_set_id=1), defining different parameters than GPS0, followed by one GDU 105-n3 and one ADU 105-n4. According to this example, GDU 105-n3 refers to GPS1, defined in the sample, and activates its use. ADU 105-n4 refers to APS0 of the sync sample 105-1. Like sample 105-2, sample 105-n may be a self-decodable sample or a non-self-decodable sample, however, it cannot be a sync sample since it depends on a parameter set of another sample.

Still for the sake of illustration, sample 105-m comprises one GDU 105-m3 and one ADU 105-m4. Sample 105-m may be a self-decodable sample or a non-self-decodable sample however, it cannot be a sync sample since it depends on parameter set of another sample, either GPS0 and APS0 for sample 105-1 or GPS1 of sample 105-n and APS0 of sample 105-1.

As illustrated, sample 105-o comprises parameter set APS1 105-o2 (with aps_attr_parameter_set_id=2) defining different parameters than APS0, followed by one GDU 105-o3 and one ADU 105-o4. According to this example, GDU 105-o3 refers to GPS1 defined in the sample 105-n and ADU 105-o4 refers to APS1 and activates its use. Sample 105-o may be a self-decodable sample or a non-self-decodable sample, but it cannot be a sync sample since it depends on a parameter set of another sample.

According to the illustrated sequence 100, a parser that starts reading the sequence from any one of the samples except sync sample 105-1 needs to recover one or more parameter sets from one or more previous samples (the previous sync sample and/or another sample between the sync sample and the first accessed sample). For example, reading from sample 105-n requires to retrieve the SPS and APS0 from the sample 105-1.

In another example, reading from sample 105-m and assuming it refers to GPS1 and APS0, the parser needs to retrieve SPS and APS0 from sample 105-1 and GPS1 from sample 105-n.

In yet another example, reading from sample 105-o, the parser needs to retrieve SPS from sample 105-1, and GPS1 from sample 105-n.

FIG. 1b illustrates an example of encapsulation of G-PCC bit-stream 100 according to the ISO Base Media File Format (ISOBMFF) structure, as defined in ISO/IEC 23090-18.

ISOBMFF-based media file 110 encapsulating media data corresponding to a G-PCC bit-stream 100 starts with a File TypeBox ('ftyp') box (not illustrated) providing a set of brands identifying the precise specifications to which the encapsulated media data conforms. These brands are used by a reader to determine whether it can process the encapsulated media data. The 'ftyp' box is followed by a MovieBox ('moov') box referenced 120 and a MediaDataBox 'mdat' 150 (or an IdentifiedMediaDataBox 'imda' not illustrated). The 'mdat' or 'imda' box contains the media data (possibly timed or untimed), i.e., the G-PCC bit-stream, or part thereof, that are described by other boxes in the MovieBox. Alternatively, the G-PCC bit-stream, or part thereof, may be encapsulated into several media data boxes (e.g., MediaDataBox 'mdat' or IdentifiedMediaDataBox 'imda'), the content of each media data box being described by other boxes in the MovieBox 'moov' or in a MovieFragmentBox 'moof'.

The MovieBox box provides initialization information that is needed for a reader to initiate processing of the encapsulated media data. In particular, it provides a description of a presentation composed of the encapsulated media data, a description of each track composing the presentation, and information regarding their respective timelines and characteristics or properties.

As illustrated, 'moov' box 120 comprises a TrackBox ('trak') boxes 125 describing a track in the presentation. TrackBox box 125 describes a sequence of samples representing the G-PCC bit-stream, each sample representing the media data of the G-PCC bit-stream usually associated with a single time. TrackBox box 125 includes in its box hierarchy a MediaBox 'mdia' (not illustrated) that describes the creation date of the ISOBMFF file and the duration of the encapsulated media data. The 'mdia' box contains a MediaInformationBox ('minf') which in turn contains a Sample TableBox ('stbl') box 130. This Sample TableBox contains descriptive and timing information of the timed media samples, for example timed media samples 105-1 to 105-o, whose media data are contained in 'mdat' 150. In particular, Sample TableBox 130 contains a SampleDescriptionBox ('stsd') 135 containing a dedicated box 160 derived from a SampleEntry Box (or derived from a box derived from the SampleEntry Box, such as a VisualSampleEntry box for video media data or AudioSampleEntry for audio media data). This dedicated box 160, identified by a Four-character code (4 CC), and named hereafter with the generic term sample entry, describes the type of sample contained in the track. When encapsulating a G-PCC bit-stream, this sample entry 160 is either identified with the 4 CC 'gpe1' or 'gpeg' for a single track encapsulation, as illustrated here. For the sake of illustration, FIG. 1*b* illustrates the case of a 'gpeg' sample entry where the parameter sets may be present in the sample entry 160, or in the bit-stream in the MediaData box 150.

In the case of multi-tracks encapsulation of a G-PCC bit-stream, as defined in ISO/IEC 23090-18, where geometry and attribute data units of the G-PCC bit-stream are carried in different tracks, the sample entry 160 may be of the 'gpcg' or 'gpt1' type, possibly containing SPS and/or GPS when a GPCCComponentInfoBox with a gpcc_type=2 is defined in the sample entry, i.e., corresponding to a track carrying only geometry information, or APS when GPCC-ComponentInfoBox with a gpcc_type=4 is defined in the sample entry, i.e., corresponding to a track carrying only attribute information. In case of multi-tracks encapsulation of tiled G-PCC bit-stream, the sample entry 160 of a tile base track may be of the 'gpeb' or 'gpcb' type, possibly containing SPS, GPS, or APS.

The MediaDataBox 'mdat' 150 contains the media data, or part thereof, of the timed samples, in particular of timed samples 105-1 to 105-o described by the 'moov' box and the TrackBox boxes. These samples correspond to those described in FIG. 1*a*.

As an alternative, the sample entry 'gpeg' (or 'gpcg', 'gpt1', 'gpeb', or 'gpcb') may contain some of the parameter sets from a sample. For example, during encapsulation, SPS, GPS0, and APS0 from sample 105—may either be kept in sample 105-1 or may be extracted and copied in 'gpcC' box as illustrated for the SPS with reference 170.

According to ISOBMFF, a parser can only perform a random access from a sync sample, i.e. from a self-contained sample signaled as a sync sample. However, it may be useful for a parser to perform a finer random access, for instance by allowing random access from any self-decodable sample in a bit-stream even if this sample is not self-contained or not signaled as a sync sample, provided a parser can retrieve easily all the parameter set(s) that are required.

To provide such finer random-access capabilities, ISO/IEC 23090-18 suggests (in amendment AMD1) to use a dedicated sample group (using the 'sgpd' and 'sbgp' boxes of ISOBMFF) to identify a sample that actually contains parameter sets. The SampleGroupDescriptionBox of grouping_type='gpsg' may contain the following description entry:

```
aligned(8)   class   GPCCParameterSetInfoEntry   extends
VolumetricVisualSampleGroupEntry ('gpsg') {
   unsigned int(8) parametersetType;
}
``` where parametersetType value is 1 for SPS, 2 for GPS, 3 for APS, and other values are reserved.

Accordingly, in order to make it possible for a parser to perform a random access from any sample, i.e., to make sure that all the parameter sets that are needed are collected, the parser may use the 'gpsg' sample group that identifies all the samples, from the considered sample down to the previous sync sample (included), which contain parameter sets. Once collected, the parameter sets are provided to the decoder with the payload of the considered sample.

This leads to collecting all the parameter sets from the samples declared in a 'gpsg' sample group, without knowing whether these parameter sets are actually needed to decode the considered sample, and parsing those samples in order to collect the parameter sets.

In addition, an ISOBMFF writer should parse each G-PCC unit of each sample to add the 'gpsg' sample group. The same parsing is also required in an ISOBMFF reader (or parser) to collect and extract the G-PCC units to provide the random access capability. In other words, the extraction of all parameter sets requires a player to parse the headers of G-PCC units in each sample mapped to a 'gpsg' sample group description entry to locate the corresponding parameter set data unit(s). Moreover, this extraction may result in additional parameter sets than the ones actually needed to decode a sampleX sample.

Therefore, there is a need for an improved random access solution.

SUMMARY OF THE DISCLOSURE

The present disclosure has been devised to address one or more of the foregoing concerns.

In this context, there is provided a solution for improving encapsulation of point cloud data.

According to a first aspect of the disclosure there is provided a method of encapsulating point cloud data into an ISOBMFF-based media file, the point cloud data being organized in point cloud frames, the method comprising:

generating a track describing a sequence of samples, each sample comprising at least one point cloud frame, the sequence of samples comprising at least one sync sample and a plurality of non-sync samples, at least one non-sync sample of the plurality of non-sync samples comprising a parameter set;

generating metadata describing whether a non-sync sample of the plurality of non-sync samples requires, to be decoded, a parameter set from another non-sync sample of the plurality of non-sync samples; and, encapsulating the track and the metadata in the media file.

Accordingly, the method of the disclosure enables an improved parameter set extraction by providing solutions that reduce the number of parameter sets to be extracted by a parser doing a random access to a non-sync sample only to a limited set or to the exact set of parameter sets required to decode the accessed non-sync sample. In addition, the method of the disclosure provides a solution that may require the parsing of samples only by the ISOBMFF writer during the encapsulation process (i.e., the parser would not need any more to parse the samples to retrieve the parameter sets).

According to some embodiments, the metadata indicate whether the non-sync sample is decodable without access to any other non-sync sample.

Still according to some embodiments, the metadata comprise an indication to indicate that the non-sync sample requires, to be decoded, a parameter set from the at least one sync sample.

Still according to some embodiments, the metadata comprise information for identifying the another non-sync sample, the non-sync sample requiring, to be decoded, a parameter set from the another non-sync sample.

Still according to some embodiments, the metadata comprise information for obtaining the required parameter set in the another non-sync sample.

Still according to some embodiments, the metadata further describe a parameter set required by the non-sync sample to be decoded.

Still according to some embodiments, whether the non-sync sample requires a parameter set from the another non-sync sample to be decoded is signaled in a sample group.

Still according to some embodiments, the method further comprises determining whether the non-sync sample requires a parameter set from the another non-sync sample to be decoded, generating the metadata being based on the determining.

Still according to some embodiments, determining whether the non-sync sample requires a parameter set from the another non-sync sample to be decoded comprises determining a list of contained parameter sets and/or a list of required parameter sets for each non-sync sample of the plurality of non-sync samples.

Still according to some embodiments, the method further comprises determining an offset from a sync sample to each non-sync sample comprising a parameter set.

According to a second aspect of the disclosure there is provided a method of parsing a media file comprising encapsulated point cloud data, the media file comprising a track and metadata, the track describing a sequence of samples, each sample comprising at least one point cloud frame, the sequence of samples comprising at least one sync sample and a plurality of non-sync samples, at least one non-sync sample of the plurality of non-sync samples comprising a parameter set, the method comprising:

identifying a non-sync sample of the plurality of non-sync samples;
    obtaining, from the metadata, an indication describing whether the identified non-sync sample requires, to be decoded, a parameter set from another non-sync sample of the plurality of non-sync samples; and
    decoding the identified non-sync sample as a function of the obtained indication.

Accordingly, the method of the disclosure enables an improved parameter set extraction by providing solutions that reduce the number of parameter sets to be extracted by a parser doing a random access to a non-sync sample only to a limited set or to the exact set of parameter sets required to decode the accessed non-sync sample. In addition, the method of the disclosure provides a solution that may require the parsing of samples only by the ISOBMFF writer during the encapsulation process (i.e., the parser would not need any more to parse the samples to retrieve the parameter sets).

According to some embodiments, the identified non-sync sample is decoded without accessing the another non-sync sample of the plurality of non-sync samples if the obtained indication indicates that the identified non-sync sample does not require, to be decoded, a parameter set from the another non-sync sample.

Still according to some embodiments, the method comprises identifying, from the metadata, the another non-sync sample, the identified non-sync sample requiring, to be decoded, a parameter set from the another non-sync sample.

Still according to some embodiments, the method further comprises obtaining information, from the metadata, to obtain the required parameter set in the identified another non-sync sample.

Still according to some embodiments, the method further comprises identifying a parameter set required by the identified non-sync sample to be decoded.

According to a third aspect of the disclosure there is provided a method of encapsulating point cloud data into an ISOBMFF-based media file, the point cloud data being organized in point cloud frames, the method comprising:

generating a track describing a sequence of samples, each sample comprising at least one point cloud frame, the sequence of samples comprising at least one sync sample followed by a plurality of non-sync samples, at least one of the non-sync samples comprising a parameter set;
    generating metadata describing the parameter set of the at least one non-sync sample, the generated metadata being associated with the at least one sync sample; and,
    encapsulating the track and the metadata in the media file.

Accordingly, the method of the disclosure enables an improved parameter set extraction by providing solutions that reduce the number of parameter sets to be extracted by a parser doing a random access to a non-sync sample only to a limited set or to the exact set of parameter sets required to decode the accessed non-sync sample. In addition, the method of the disclosure provides a solution that may require the parsing of samples only by the ISOBMFF writer during the encapsulation process (i.e., the parser would not need any more to parse the samples to retrieve the parameter sets).

According to some embodiments, the metadata comprise a type of the parameter set of the at least one non-sync sample, an identifier of the parameter set of the at least one non-sync sample, and/or an offset to access the parameter set of the at least one non-sync sample.

Still according to some embodiments, the method further comprises copying the parameter set of the at least one non-sync sample in the at least one sync sample.

According to a fourth aspect of the disclosure there is provided a method of encapsulating point cloud data into an ISOBMFF-based media file, the point cloud data being organized in point cloud frames, the method comprising:

generating a track describing a sequence of samples, each sample comprising at least one point cloud frame, the sequence of samples comprising at least one sync sample and a plurality of non-sync samples, at least one non-sync sample of the plurality of non-sync samples comprising a parameter set;
    generating metadata describing whether a non-sync sample of the plurality of non-sync samples requires, to be decoded, a parameter set from another sample of the sequence of samples; and,
    encapsulating the track and the metadata in the media file.

This aspect of the disclosure has optional features and advantages similar to those mentioned above.

According to another aspect of the disclosure there is provided a device comprising a processing unit configured for carrying out each of the steps of the method described above.

This aspect of the disclosure has advantages similar to those mentioned above.

At least parts of the methods according to the disclosure may be computer implemented. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present disclosure may take the form of a computer program product embodied in any tangible medium of expression having computer usable program code embodied in the medium.

Since the solution of the present disclosure can be implemented in software, the solution of the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Some embodiments of the disclosure will now be described, by way of example only, and with reference to the following drawings in which.

DETAILED DESCRIPTION OF THE DISCLOSURE

According to some embodiments of the disclosure, information regarding parameter sets that are needed for a sample to be decoded is associated with the sample to make it possible to improve random access, in particular from this sample. Such information may comprise an indication to indicate whether the sample contains all the parameter sets that it needs to be decoded, an indication to indicate which parameter sets are required for the sample to be decoded, an indication to indicate in which samples the parameter sets that are required for the sample to be decoded may be obtained, and/or an indication to indicate where, within a sample, the parameter sets that are required for the sample to be decoded may be obtained.

For the sake of clarity, the following definitions are used in this disclosure:

a self-decodable sample is a sample that is independently decodable, i.e., that does not have coding dependencies on another sample (e.g. this sample does not use inter prediction in its decoding process). A self-decodable sample may also be denoted an intra-coded or intra-predicted sample. On the contrary, a non-self-decodable sample may be denoted an inter-coded or inter-predicted sample. A self-decodable sample may or may not depend on parameter sets defined in another sample;

a self-contained sample is a sample that is self-decodable and contains the parameter set(s) required to decode the sample either in the sample or in the sample entry;

a sync sample is a self-contained sample which is signaled as a sync sample by one of the specific boxes of the ISOBMFF standard; and a non-sync sample is a sample which is not signaled as a sync sample. For example, a non-sync sample may be a self-contained sample that is not signaled as a sync sample. It may be a self-decodable sample or a non-self-decodable sample, i.e., a sample that uses inter prediction in its decoding process.

Figure 2:
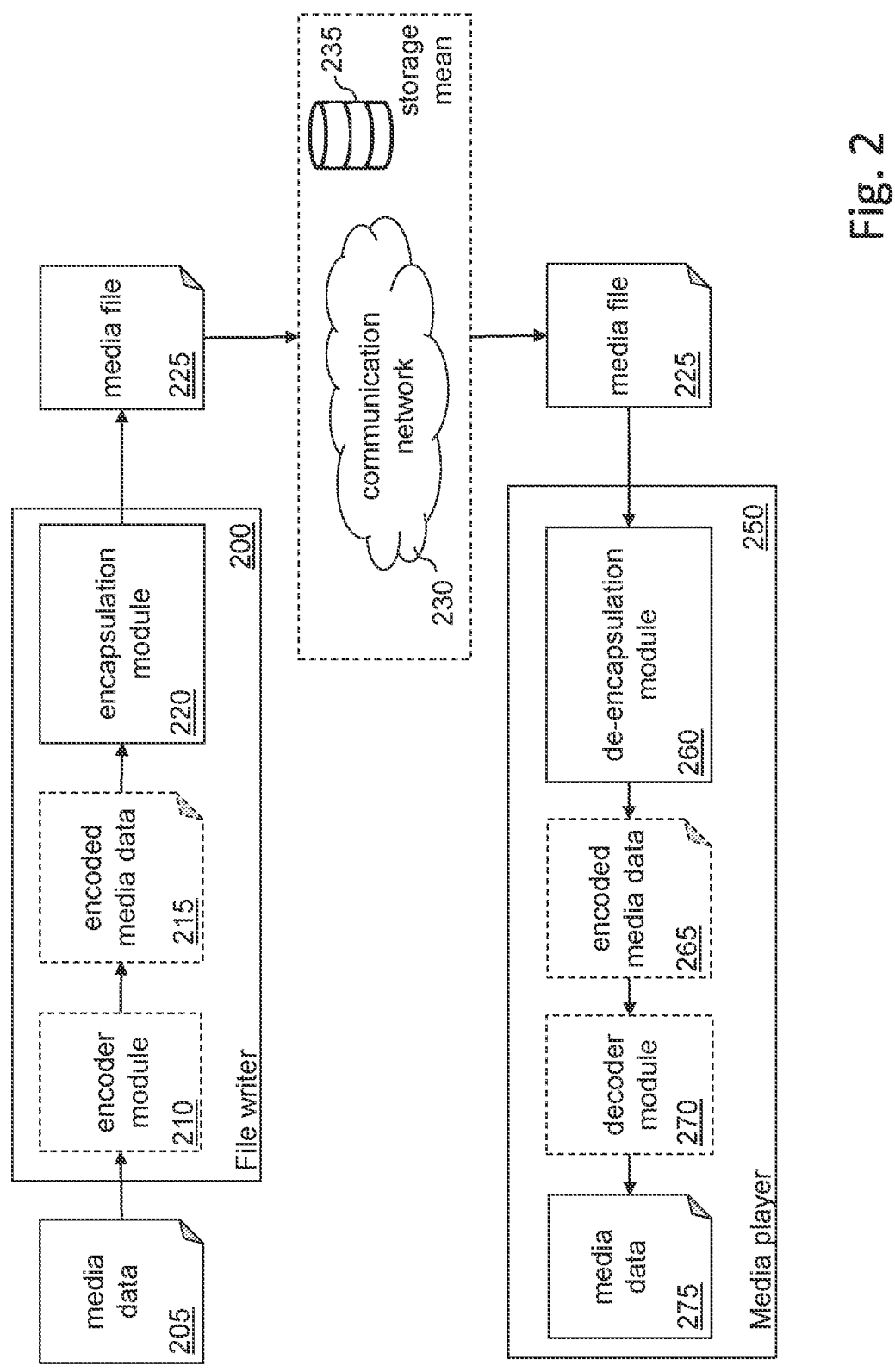
FIG. 2 illustrates an example of a system wherein the method of the disclosure may be implemented.

FIG. 2 illustrates an example of a system wherein the method of the disclosure may be implemented. More precisely, the invention may be used in a media file writer such as media file writer 200 or in a media player such as media player 250 or in both.

As illustrated, media file writer 200 takes media data, such as media data 205, as input. Media file writer 200 processes media data 205 to prepare them for streaming or for storage, according to an encapsulation process. Encapsulation comprises adding metadata describing the media data. For the sake of illustration, such metadata may comprise types of data, codecs used, a media data size, data offsets, timing information, etc.

Media data 205 may be raw data captured by sensors or data generated by content creators or editing tools. According to particular embodiments, media data 205 may be point cloud data (or volumetric data). Alternately, media data 205 may be obtained as compressed or encoded media data, possibly as different encoded versions. For example, point cloud data may be compressed using the MPEG-I Part-9 standard. Accordingly, the media data may be encoded or compressed within file media writer 200, for example in encoder module 210, or in another device to obtain encoded media data 215. Such an encoding or compression may be live encoding or compression (as well as the encapsulation).

Media data 205 or encoded media data 215 are encapsulated by media file writer 200, using encapsulation module 220, into movie file or movie fragments, for example according to ISOBMFF MPEG-I Part-18 when the media data are point cloud data, to generate media file 225 or one or more file segments 225.

Media file writer 200 may optionally generate a streaming manifest like a DASH (Dynamic Adaptive Streaming over HTTP (Hypertext Transfer Protocol)) MPD (Media Presentation Description) or an HLS (HTTP Live Streaming) playlist (not represented). The generated file, segment files, and/or manifest may be stored locally or in a network storage, such as network storage 235, for redistribution via on-demand or live streaming through communication network 230. To that end, media file writer 200 may be connected, via a network interface (not represented), to communication network 230 to which may also be connected, via a network interface (not represented), a media player 250 comprising a de-encapsulation module 260.

Figure 3:
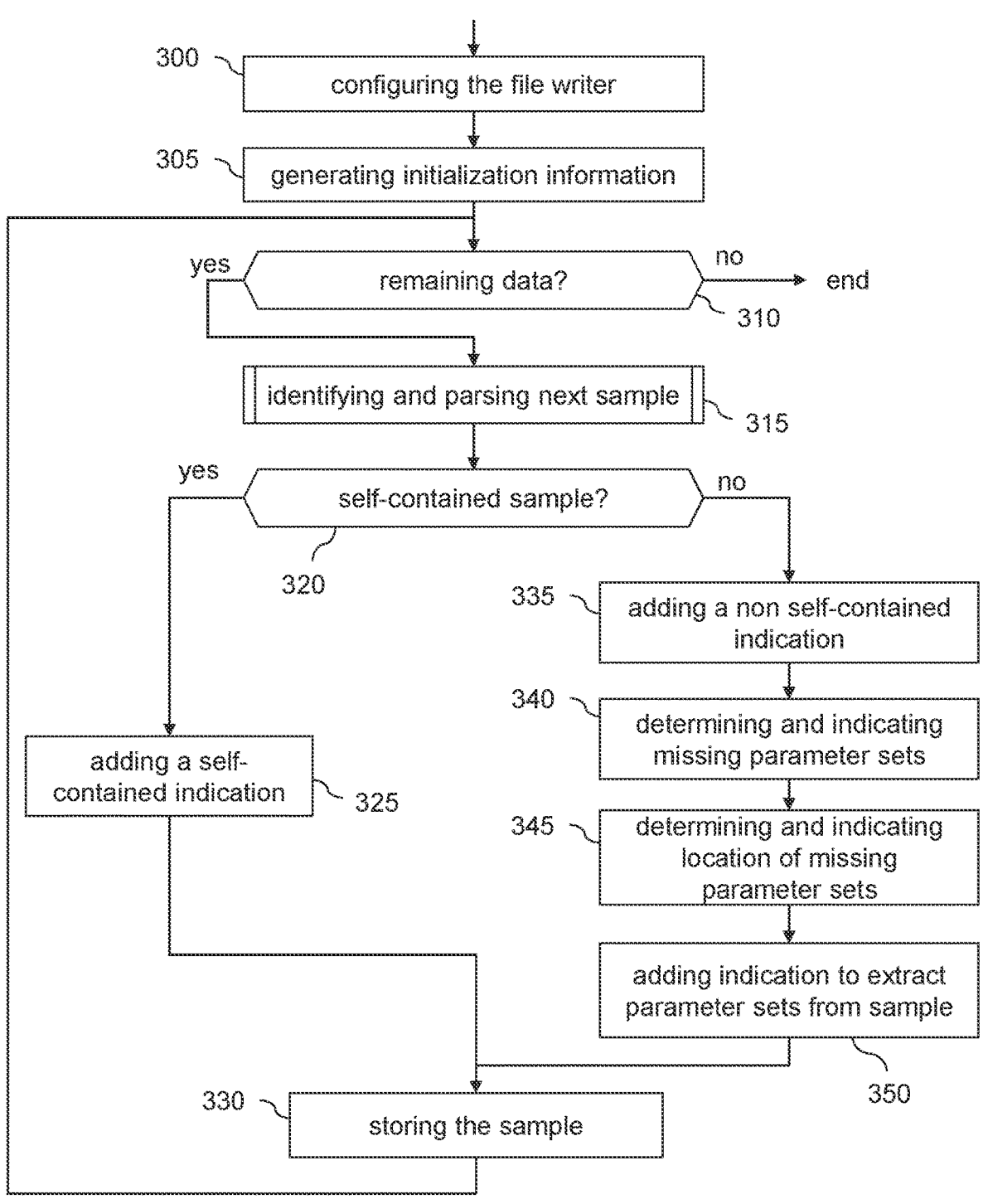
FIG. 3 illustrates a first example of steps for a file writer (e.g., an ISOBMFF writer) to provide additional information in ISOBMFF metadata description, in order to enable fine random access by an ISOBMFF reader or parser.
Figure 7:
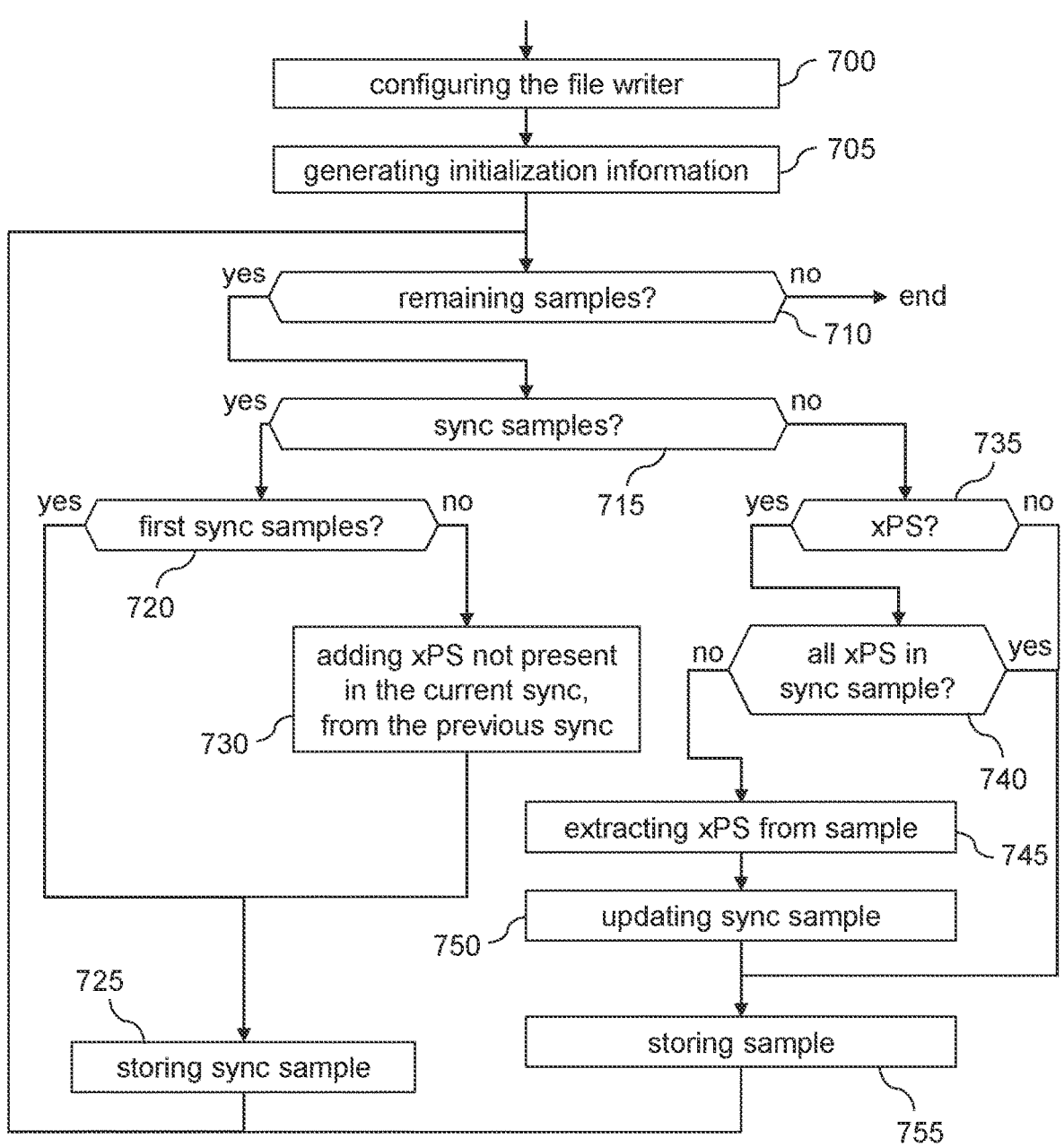
FIG. 7 illustrates a second example of steps for a file writer (e.g., an ISOBMFF writer) to provide additional information in ISOBMFF metadata description, in order to enable fine random access by an ISOBMFF reader or parser.

Examples of the encapsulation process, implementing the method of the disclosure for providing information in metadata to facilitate a random access, are described in reference to FIG. 3 and FIG. 7.

Media player 250 is used for processing encapsulated media data received from communication network 230 or read from a local or remote storage device, for example for processing media file or media segments 225. The encapsulated media data may be streamed to the media player, thus involving a streaming module (not represented) in charge of parsing a streaming manifest and of determining requests to fetch the media streams and of adapting the transmission, according to indication in the manifest and media player parameters like the available bandwidth, CPU resources, application needs, or user preference.

The encapsulated media data are parsed (or de-encapsulated) in de-encapsulation module 260 (also known as a ISOBMFF parser or ISOBMFF reader or simply parser or reader) to obtain media data 275 (e.g., point cloud data) or encoded media data 265 (e.g., point cloud bit-stream) if the encapsulated media data have been encoded or compressed before being encapsulated. If the encapsulated media data have been encoded or compressed before being encapsulated, the de-encapsulated data (or parsed data) may be decoded by a decoder module 270 to obtain media data 275. The decoder module may be part of the media player, may be an external module, or may be a dedicated hardware. The obtained media data may be stored, displayed, or transmitted to an application or to a user.

The de-encapsulation, decoding, and rendering may be live operations, leading to processing the media file as soon as it is received, for example by processing data chunks for each media stream, in parallel and in synchronization, to minimize the latency between the recorded multimedia presentation (e.g., media data 205) and its visualization by a user (e.g., media data 275), for example onto his/her device's screen.

It is noted that media file 225 may be transmitted to media player 250 in different ways. In particular, file writer 200 may generate media file 225 with a media description (e.g., DASH MPD) and communicate (or stream) it directly to media player 250 upon receiving a request from media player 250. Media file 225 may also be downloaded, at once or progressively, by the media player and stored locally by media player 250.

Figure 5:
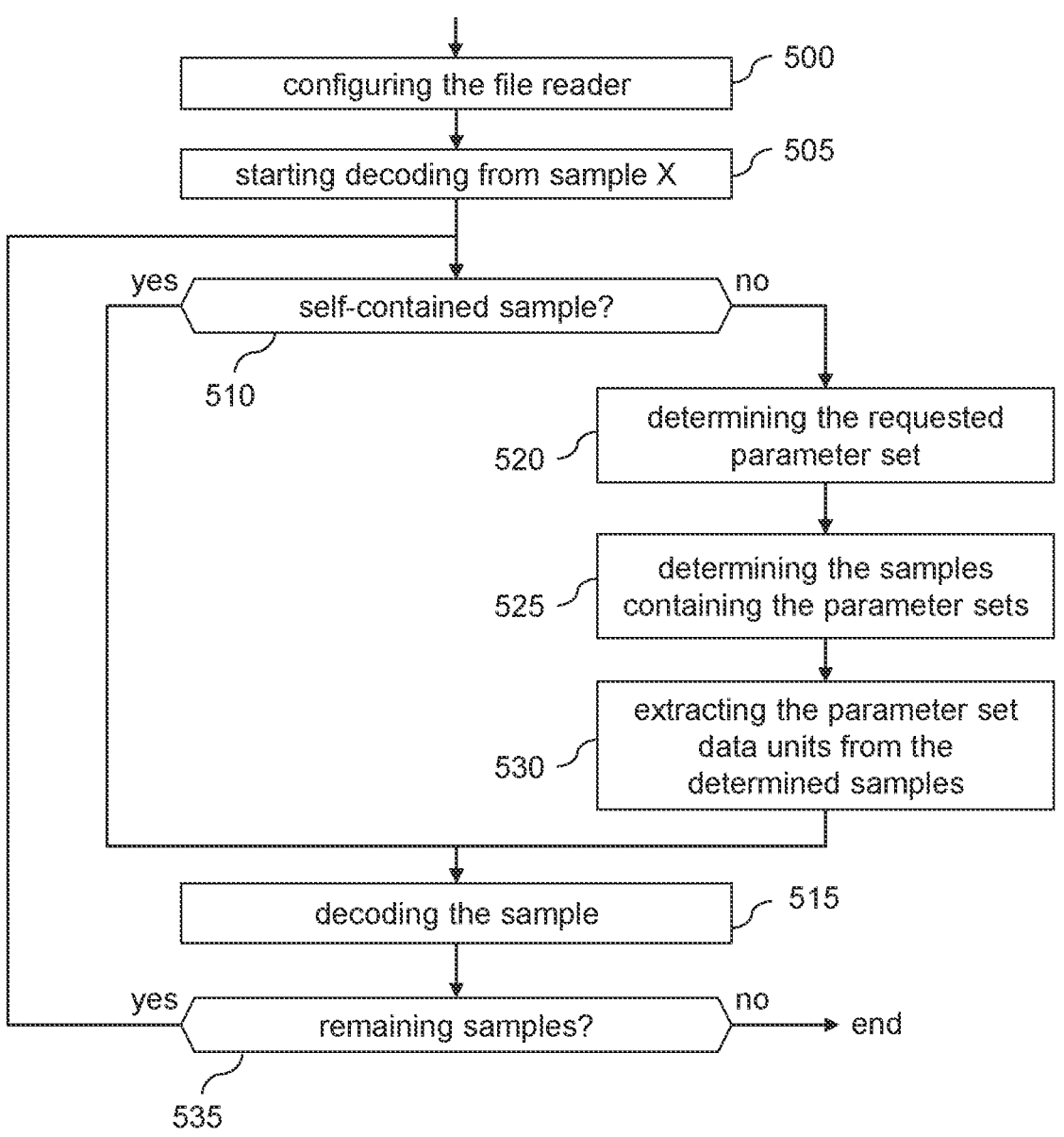
FIG. 5 illustrates an example of steps carried out in an ISOBMFF reader or parser to provide required parameter sets when a random access is performed from any sample of an encapsulated G-PCC bit-stream.

The parsing process performed using de-encapsulation module 260, according to some embodiments of the disclosure, is further described in reference to FIG. 5.

Encapsulation Process

FIG. 3 illustrates a first example of steps for a file writer (e.g., an ISOBMFF writer) to provide additional information in ISOBMFF metadata description, in order to enable fine random access by an ISOBMFF reader or parser.

To that end, one or more indications may be associated to each sample to indicate whether the sample is a self-contained sample, what are the parameter sets that are required to decode the sample, in which non-sync samples the parameter sets that are required to decode the sample may be found, and/or where the parameter sets that are required to decode the sample may be found within a sample.

Since some of these indications may be redundant, they are not all necessarily indicated or checked. For example, the indication as to whether the sample is a self-contained sample may be derived from the indication as to where the parameter sets that are required to decode the sample may be found. Likewise, the indication as to what are the parameter sets that are required to decode the sample may be at least partially derived from the indication as to where the parameter sets that are required to decode the sample may be found. In addition, some of these indications may depend on another of these indications. For example, the indication as to where, within a non-sync sample, the parameter sets that are required to decode the sample may be found may have a significance only if it can be determined in which non-sync sample the parameter sets that are required to decode the sample may be found.

As illustrated, a first step is directed to the configuration of the media file writer (step 300), for example media file writer 200 in FIG. 2. This configuration may set up some parameters of the encapsulation module, for example encapsulation module 220 in FIG. 2. In particular, it may comprise setting a number of tracks. For the sake of illustration, a single-track encapsulation may be used for encapsulating point cloud data, where all samples contain G-PCC data units (GDUs and corresponding number of ADUs) using the 'gpeg' sample entry type. Alternately, a multi-track encapsulation may be used, where the geometry and attributes are stored in different tracks, using the 'gpcg' sample entry type (or the 'gpt1' sample entry type when G-PCC tiles are also stored in different tile tracks). In addition, the media file writer may be set-up to add parameter sets of a sample in the sample entry of the track when a G-PCC sample is identified as a sync sample. It is to be noted that the media file writer may also decide to store some parameter sets from non-sync samples in the sample entry rather than with the data of the corresponding non-sync sample. This setting may also constraint the storing in sample entry to a predefined number of parameter sets.

Other settings may also be used to indicate whether all the self-contained samples should be signaled as sync samples, or only some of them using, for example, a predefined threshold time value. In such a case, there may be self-contained samples that are stored as non-sync samples (i.e., that are not signaled as sync samples).

The configuration may also be directed to an encoder module, for example encoder module 210 in FIG. 2. If the media data to be encapsulated are point cloud data, encoder settings may specify the number of attributes that are encoded and the number of attribute data units (ADUs) present for one geometry data unit (GDU) in a sample. The configuration may also comprise indicating whether the settings apply to all the samples of the considered sequence or the settings may change for some samples.

The configuration parameters may be predetermined (e.g., stored in the media file writer) or specified by a user, for example through a command line, control scripts, or through a graphical user interface.

In addition to the configuration of the encapsulation module, metadata structures of a media file such as top-level boxes (e.g., 'ftyp' or 'styp', 'moov', 'trak', 'mdat', and boxes for sample description like 'stb'/and 'stsd') may be created during an initialization step (step 305). Such an initialization step may comprise reading parameter sets (e.g., a geometry and attribute parameter sets) from an encoded bit-stream of point cloud data or may comprise obtaining information about a sensor (in particular when the media data to encapsulate are uncompressed data) like a number of points, types of attributes associated with the points (e.g., a color, a reflectance, a timestamp, areas of interests, etc.).

It is noted that some of the setting parameters defined in configuration step 300 may be reflected in the track description or sample description. When encapsulation is performed from a G-PCC bit-stream, initialization may also comprise determining the size of the file (e.g., in Bytes) in an internal variable (e.g., File_Size) and sets another variable indicating the size of the read data (e.g., Read_Size) to an initial value 0. When the encapsulation is based on data obtained from an internal encoder, it may be assumed that the encoder provides G-PCC bit-stream sample by sample.

After having configured the media file writer and generated initialization information, the encapsulation process checks whether there are remaining data to read from the G-PCC bit-stream (step 310). When encapsulating an encoded G-PCC bit-stream, checking whether there are remaining data to read from the G-PCC bit-stream may comprise verifying that the total amount of read data (Read_Size) is smaller than the size of the file (File_Size). Alternately, when encapsulating a G-PCC bit-stream provided by an internal encoder module, determining whether there are remaining data to encapsulate may be based on a state of the encoder signaling end of the encoding operation.

If there are further data to be encapsulated, the next sample to be encapsulated is obtained and parsed (step 315), for example as described by reference to FIG. 4, that makes it possible to obtain, for each sample, a list of parameter sets present in the sample (for example denoted xPS_Sample), a list of parameter sets that are required to decode the sample (for example denoted Required_xPS), and a temporary list (for example denoted Map) that gathers information about the parameter sets present in samples. According to particular embodiments, each element of the Map list corresponds to a sample comprising at least one parameter set and contains:

the offset of the sample from the previous sync sample
  (e.g., the value of a Offset_From_Sync field), and
the list of parameter sets present in the sample.

Next, it is determined whether the sample is a self-contained sample (step 320). For the sake of illustration, this can be done by determining whether all the parameter sets that are required for decoding the sample, as indicated within the Required_xPS list associated with the sample, are stored within the sample, as indicated within the xPS_Sample list associated with the sample, or belong to the xPS_Sample list of the Map[0] list element (i.e., are in the preceding sync sample or in its sample entry).

If the sample is a self-contained sample, the self-contained property is signaled, for example by adding a self-contained indication to the description of the sample (step 325). The self-contained indication may be signaled explicitly or implicitly, for example if the non-self-contained samples are systematically signaled. Examples of signaling a self-contained property are provided hereafter.

Once the self-contained property is indicated (step 325), the media file writer adds and stores the sample into the media data box ('mdat') of the track (step 330). This also comprises updating associated boxes, for example indicating a size ('stsz') and a chunck offset ('stco'), as defined in ISOBMFF.

On the contrary, if the sample is not a self-contained sample (test 320 false), the non-self-contained property is signaled, for example by adding a non-self-contained indication to the description of the sample (step 335). The non-self-contained indication may be signaled explicitly or implicitly, for example by providing an indication as to where a parameter set that is required to decode the sample may be found.

Next, the missing parameter sets, i.e., the parameter sets that are required to decode the sample (for example for random access purpose), but that are not contained within the sample, may be determined and signaled (step 340).

It is to be noted that step 340 (like steps 345 and 350 described hereafter) are optional steps that may depend on settings of the media file writer to provide more or less information to ease random access operations for a parser or a reader. According to particular embodiments, all these steps are performed by the media file writer, enabling a parser to only parse ISOBMFF metadata structure to enable random access from any G-PCC sample.

Determining the missing parameter sets may be based on the xPS_Sample and Required_XPS lists. Indeed, the media file writer may identify a list of missing parameter sets (denoted the missing_xPS list) by removing, from the Required_XPS list, all the elements that are present in both the Required_XPS and the xPS_Sample lists. The parameter sets that are still present in the Required_XPS list are the ones that are missing in case of random access. Parameter sets may be identified by their type and identifier values (tlv_type, ID) or by the position of the data unit(s) corresponding to a parameter set in the sample (denoted later TLV_pos).

Examples of signaling missing parameter sets are provided hereafter.

Next, the locations of the non-sync samples and/or last sync sample containing missing parameter sets are determined and signaled (step 345). According to particular embodiments, the determination is based on the Map list (as determined in step 315). It should be noted that at this stage, the Map list contains at least two elements, one corresponding to the last determined sync sample (corresponding to element Map [0]) and one for a non-sync sample present in the sequence between the considered sample and the last determined sync sample. To determine the locations of the missing parameter sets, it is searched, in the Map list, for each parameter set of the missing_xPS list, in which xPS_Sample list of the Map list the missing parameter set is present. When it is found, the value of the Offset_From_Sync may be used by the media file writer to signal where a missing parameter is located (step 345).

Next, it is determined where, in non-sync samples and/or in the last sync sample, the parameter sets that are required to decode the considered sample, are located (step 350). According to particular embodiments, to enable an easy extraction by a reader (without any G-PCC unit parsing), all the parameter sets of a sample are located in contiguous G-PCC units at the beginning of the sample. This enables the reader to extract all parameter sets from a sample in a single operation. To guarantee that parameter sets are in contiguous G-PCC units at the beginning of the sample, several options are possible. For example, a restriction may be applied during encoding (e.g., through specifications) to require that all parameter sets are encoded at the beginning of a sample. According to another example, the media file writer may reorder the G-PCC units before they are stored and modify the xPS_Sample list in the Map list to reflect the new order.

According to this restriction, a G-PCC bit-stream is encapsulated as a single G-PCC track, with a sample entry type set to 'gpeg', when G-PCC units corresponding to parameter sets are present before or within data units for a G-PCC frame. These G-PCC units corresponding to parameter sets are preferably stored as first data units (in the media data) for the G-PCC sample corresponding to the G-PCC frame. Likewise, for multi-track encapsulation, the data units corresponding to geometry parameter sets are preferably stored as the first data units for a sample of a geometry track ('gpcg') in the media data box and the data units corresponding to attribute parameter sets are preferably stored as the first data units for a sample of an attribute track ('gpcg') in the media data box. This has some advantages to rapidly locate and extract a set of parameter sets present in a sample, for example as a single byte-range or as a number of consecutive G-PCC units. This may be used in the different variants for sample group description entries describing the parameter sets (like 'gpsg', 'gpss' or 'gpsr' with a sample offset or 'gpsr').

After having signaled the non-self-contained property, the missing parameter sets, the samples containing the missing parameter sets, and/or the locations of the missing parameter sets, the media file writer adds and stores the sample into the media data box ('mdat') of the track (step 330). Again, this also comprises updating associated boxes, for example indicating a size ('stsz') and a chunck offset ('stco'), as defined in ISOBMFF.

As described above, the G-PCC sample is stored in the media data ('mdat') part of the ISOBMFF file after step 325 or 350. In addition, the Read_Size variable is increased by the Sample_Size determined in step 315, in case of encapsulation of an already encoded G-PCC bit-stream. Accordingly, it may be determined in step 310 that the media file writer encapsulates all the G-PCC bit-stream and that the encapsulation is done.

Figure 4:
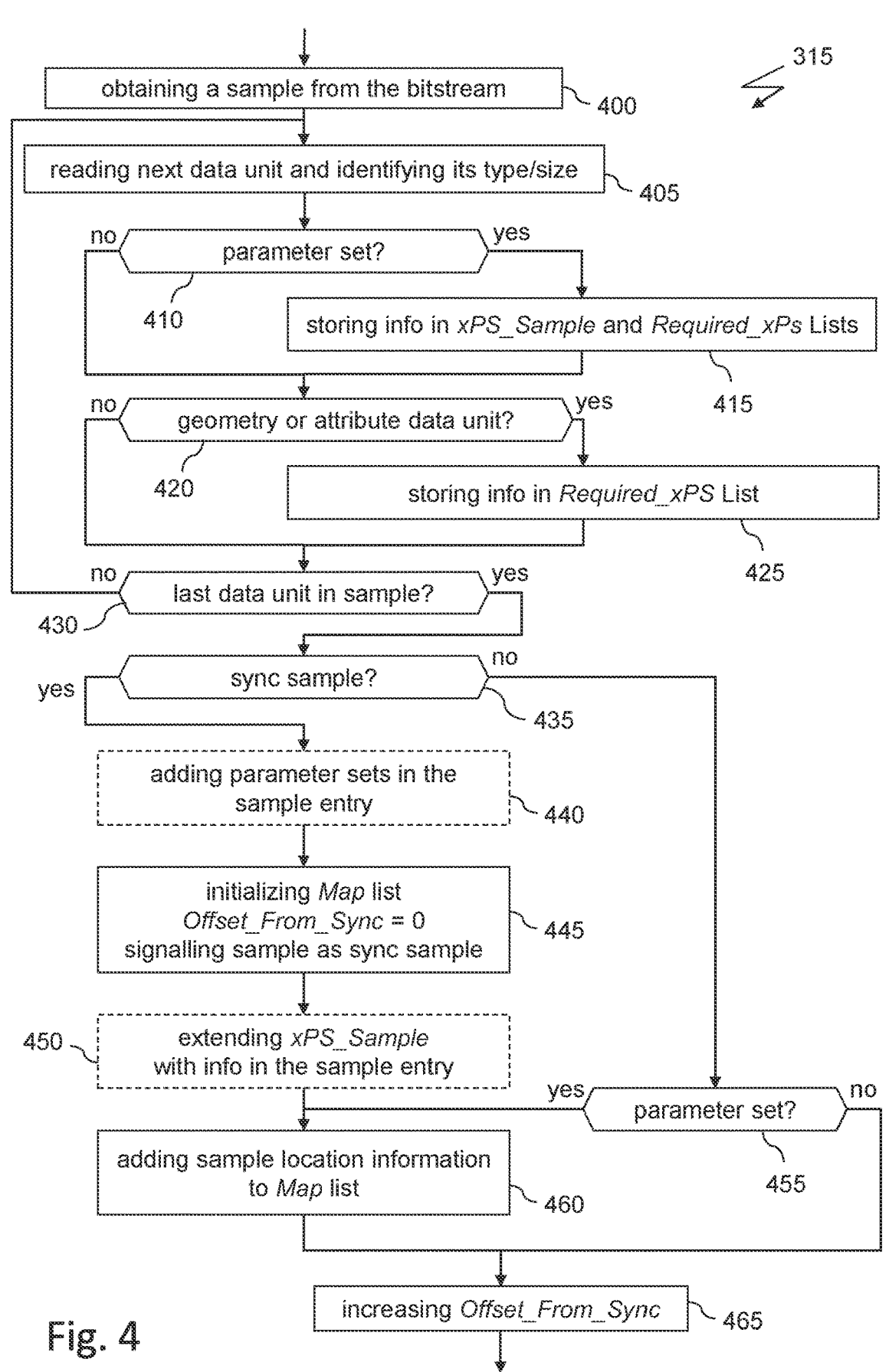
FIG. 4 illustrates an example of steps for identifying the parameter sets present in the samples and for identifying the parameter sets required for decoding the samples.

Identification of the Parameter Sets Present in the Samples and of the Parameter Sets Required to Decode the Samples FIG. 4 illustrates an example of steps carried out by an ISOBMFF media file writer for identifying the parameter sets present in the samples and for identifying the parameter sets required for decoding the samples. These steps, corresponding to a particular implementation of step 315 in FIG. 3, make it possible to characterize and describe a G-PCC sample and the parameter set information it either contains or requires to be decoded.

As illustrated, a first step is directed to obtaining a sample from the bit-stream (step 400), a G-PCC bit-stream. This may be carried out by checking that a consecutive sets of data units, e.g. G-PCC units, of the sample have the same frame counter value as determined by calculating an internal FrameCtr value. The FrameCtr value may be obtained by parsing some dedicated data units or G-PCC units, among GDUs, Tile Inventory data units, Frame-specific attribute properties data unit (FSAP), or Frame boundary marker data unit (FBM), and retrieving the frame_ctr_lsb field of any of these data units (section 8.2.2 of ISO/IEC 23090-9 explains the calculation of the FrameCtr value).

After having obtained the sample, its size (for example in bytes) is also determined, and stored in a variable, for example the Sample_Size variable. In addition, the xPS_Sample list and the Required_xPS list are initialized (they are set as empty lists). An internal variable denoted TLV_pos is also set to the value 0.

Once a sample is obtained from the bit-stream, the header of the different data units that composed the sample is read (step 405), one after another, in order to identify, for each data unit, the type of the G-PCC unit (denoted tlv_type) and the size of the G-PCC unit (denoted tlv_num_payload_bytes).

For the considered data unit, it is checked (step 410) whether the data unit (or G-PCC data unit) corresponds to a parameter set (SPS, GPS, or APS). This can be done, for example, by checking if the tlv_type value is equal to value 0 (indicating that the data unit corresponds to a SPS), to value 1 (indicating that the data unit corresponds to a GPS), or to value 3 (indicating that the data unit corresponds to an APS).

If the data unit is a parameter set and if not already in the list, items of information of this parameter set (that is present in the sample) are stored in the xPS_Sample list (step 415). The stored items of information may be some or all the following elements:

the tlv_type value of the parameter set, the unique identifier value (denoted Id) of the parameter set, that may correspond to sps_seq_parameter_set_id for a SPS parameter set, to gps_geom_parameter_set_id for a GPS parameter set, or to aps_attr_parameter_set_id for an APS, the position of the data unit in the sample (TLV_pos). For the sake of illustration, the position may be a byte offset or the index of the data unit in the sample, a flag is_InSampleEntry to identify (when true) whether the parameter set is stored in the sample entry of the track or not, and/or optionally the size of the data unit (tlv_num_payload_bytes) is also stored.

In addition, if the data unit or G-PCC unit is a GPS parameter set or an APS, parameter set information needed to decode the sample is stored in the Required_xPS list (if not already in the list). The stored items of information may be some or all the following elements:

indication of the tlv_type value 0 of the required parameter sets, corresponding here only to SPS, the unique identifier value (Id) of the SPS parameter set, which may correspond to gps_seq_parameter_set_id if the G-PCC unit is a GPS parameter set or aps_seq_parameter_set_id if the G-PCC unit is an APS.

If the data unit is not a parameter set or after having stored (if necessary) items of information of the parameter set, it is determined whether the data unit (or G-PCC unit) is a data unit representing geometry data (GDU) or representing attribute data (ADU) (step 420). This can be done, for example, by checking if the tlv_type value is equal to value 2 (indicating that the data unit corresponds to a GDU) or to value 4 (indicating that the data unit corresponds to an ADU).

If the data unit is a geometry or an attribute data unit, parameter set information needed to decode the sample is added in the Required_xPS list (if not already in the list). The stored items of information may be some or all the following elements:

indication of the tlv_type value of the required parameter set:

1 indicating a GPS when the data unit or G-PCC unit is a GDU or 3 indicating an APS when the data unit or G-PCC data unit is an ADU, the unique identifier value (Id) of the parameter, e.g., corresponding to:

gdu_geometry_parameter_set_id when the G-PCC unit is a GDU and tlv_type=1 or adu_attr_parameter_set_id when the G-PCC unit is an ADU and tlv_type=3.

the offset from the last sync sample (denoted sample_position_offset), that indicates the position of the sample that requires the indicated parameter set. When added, this parameter is set to the value of the Offset_From_Sync variable.

Next, if the data unit (or G-PCC unit) is not a GDU or an ADU or after having stored (if necessary) items of information directed to required parameter set, it is checked whether the considered data unit (or G-PCC unit) is the last one in the sample (step 430). This may be performed by calculating the position of the next possible data units or G-PCC units in terms of bytes, e.g., adding to the initial position of the G-PCC unit the value of the (tlv_num_pay-load_bytes+5), when the 5 bytes take into account the bytes used to store the tlv_type (1 byte) and the tlv_num_pay-load_bytes (4 bytes) fields. If the value of the position is less than the Sample_Size determined in step 400, there is still at least one data unit (or G-PCC unit) in the sample. In such a case, TLV_pos is incremented and the algorithm loops to step 405 to process the next data unit (or G-PCC unit).

Following steps make it possible to determine sync samples and from a sync sample, where to find some parameter sets stored in another non-sync sample.

As described above, Map list is used to gather information on the parameter sets present in samples. Each element of the list corresponds to a sample comprising at least one parameter set and contains:

the offset of the sample from the previous sync sample
(e.g., the value of a Offset_From_Sync field), and
the list of parameter sets present in the sample.

As illustrated, it is checked whether the considered sample (obtained at step 400) is a self-contained sample and may be signaled as a sync sample (step 435). This can be done by verifying that all the parameter sets of the Required_xPS list also belong to the xPS_Sample list or to the xPS_Sample list of the Map[0] list element.

Indeed, the xPS_Sample list of the Map[0] list element contains information on the parameter sets present in the last sync sample of the G-PCC bit-stream or sequence (deter-mined from a previous execution of step 435), and the information on the parameter sets contained in the sample entry of the track. Therefore, a sample which satisfies the previous conditions is a self-contained sample.

Accordingly, depending on the configuration, the media file writer may signal the self-contained sample as a sync sample. For the sake of illustration, a particular configura-tion may require to signal all self-contained samples as sync samples while another particular configuration may require to signal only a subset of the self-contained samples as sync samples, based on internal criteria. Such criteria may be based, for example, on time elapsed since the last sync sample determination.

If all the self-contained samples should be signaled as sync samples, the sample is a sync sample and test 435 is positive. On the contrary, if sample timing is used as a criterion to decide whether a self-contained sample is to be signaled as sync sample, then:

if the considered sample is the first self-contained sample, the sample is signaled as a sync sample and a timer is started, if the considered sample is a self-contained sample and the timer is higher than a threshold, the considered sample is signaled as a sync sample, and the timer is restarted, and if the considered sample is a self-contained sample and the timer is lower than a threshold, the considered sample is considered as a non-sync sample.

Optionally, the ISOBMFF media file writer may be con-figured, when using sample entry ('stsd') type 'gpeg' (or 'gpcg' or 'gpt1') to store the parameter sets, or a part thereof, of the sync sample in the sample entry (step 440). Depend-ing on the configuration of the ISOBMFF media file writer, either all the parameter sets of the sync samples are added to the sample entry or only a predefined number of param-eter sets (for example 1 or 2) are stored in sample entry. In such a case, the data corresponding to these parameter sets are removed from the sample data. Accordingly, when removing a parameter set from the data, the xPS_Sample list is updated, meaning removing the corresponding parameter set from the list and modifying the TLV_pos of other element(s) of the xPS_Sample list if needed.

Next, the Map list is initialized as an empty list, the Offset_From_Sync internal variable is initialized to the value 0, and an appropriate signaling is added in the ISOBMFF metadata to indicate the sync sample (step 445). This can be done, for example, by using a SyncSampleBox box ('stss'), a TrackRunBox box ('trun'), or a TrackFrag-mentRandomAccessBox ('tfra).

Next, if the ISOBMFF media file writer is configured to store the parameter sets, or a part thereof, in a sample entry of a track, an optional step may be carried out to add the parameter sets contained in the sample entry (if not already in the list) to the xPS_Sample list (step 450). This adds to the last sync sample added, all previous parameter sets if any added to the sample entry. This is further used to determine if a sample is a self-contained sample. The parameter sets added from the sample entry are also signaled (for example by setting the is_InSampleEntry to true), enabling in step 345 to determine and signal the location of missing param-eter sets in the last sync sample. If the considered sample is not a sync sample, a further test is performed to check whether there are some parameter sets in the current sample (step 455). It may comprise verifying that the xPS_Sample list is not empty.

If the considered sample is a sync sample or if the considered sample comprises some parameter sets, a new element corresponding to the current sample and comprising the following elements is added to the Map list (step 460):

the offset from the previous sync sample (Offset_
From_Sync value) and
a copy of the xPS_Sample list as obtained after execution
of steps 405 to 430.

It is to be noted that since the initialization of the Offset_From_Sync variable is done upon identification of the last sync sample, the Map[0] element of the list always refers to the last determined sync sample. In addition, it is observed that the parameter sets stored in sample entry are added to the xPS_Sample list of the Map[0] element (steps 440 and 450), which makes it possible for the media file writer to use the Map[0] element to decide whether a sample is a sync sample (step 435).

After having added a new element corresponding to the current sample to the Map list (step 460) or if the considered sample is not a sync sample and does not comprise any parameter set, the value of Offset_From_Sync variable is incremented (step 465). this enables to keep updated the offset between the sync sample added in the Map list and a following non-sync sample containing parameter sets. It is to be noted that the sync sample whose information is stored in the Map[0] may be the first sample of the GPCC bit-stream or sequence, or the last sync sample from the bit-stream or the last sync sample added by the media file writer (for example when starting a new ISOBMFF frag-ment).

For the sake of illustration, applying the algorithm illus-trated in FIG. 4 to the G-PCC sequence illustrated in FIG. 1a results in a Map list comprising three elements, each element comprising an Offset_From_Sync and a xPS_Sample list, as follows:

Map[0]=(Offset_From_Sync0, xPS_Sample0), where the value of Offset_From_Sync0 is equal to 0 and where xPS_Sample0 is a list comprising three elements, providing for each element three values (tlv_type, Id, TLV_pos, is_In-SampleEntry), assuming that all the parameter sets are in sync samples, as follows:

*xPS*_Sample0[0]=(0,0,0,false)

*xPS*_Sample0[1]=(1,0,1,false)

*xPS*_Sample0[2]=(3,0,2,false)

Map[1]=(Offset_From_Sync1, xPS_Sample1), where the value of Offset_From_Sync1 is equal to n−1 (offset to reach sample 105-*n*) and where xPS_Sample1 is a list comprising one element, comprising:

*xPS*_Sample1[0]=(1,1,0,false)

Map[2]=(Offset_From_Sync2, xPS_Sample2), where the value of Offset_From_Sync2 is equal to o−1 (offset to reach sample 105-*o*) and where xPS_Sample2 is a list comprising 1 element, as follows:

*xPS*_Sample2[0]=(3,1,0,false)

Signaling Self-Contained Samples

According to particular embodiments, the media file writer signals the self-contained samples by using a SampleGroupDescriptionBox (for example using the 'gpss' grouping_type (Geometry Parameter Set Self-decodable), being noted that another 4 cc code may be used), for example with the following entry:

```
aligned(8) class GPCCParameterSetInfoEntry extends
VolumetricVisualSampleGroupEntry ('gpss')) {
    unsigned int(1) sample_type;
    unsigned int(7) reserved;
}
``` where sample_type indicates:

for example when set to 0, that the sample is either a sync sample (e.g., sample 105-1 in FIGS. 1*a* and 1*b*) or a self-contained sample, i.e., a self-decodable sample that contains all needed parameter sets. This sample needs no specific treatment by a reader; and for example when set to 1, that the sample is a self-decodable sample that only requires one or more parameter sets from a previous sync sample or a sample entry (e.g., sample 105-2 or 105-*n* in FIGS. 1*a* and 1*b*). This sample needs only retrieval of some parameter sets in a sync sample or in the sample entry by a reader.

This sample group box is complementary to the 'gpsg' box indicating that there is no need to parse the 'gpsg' box to extract the parameter sets since the sample does not need any of them.

According to other particular embodiments, the self-contained property is signaled for all the samples using a specific SampleGroupDescriptionEntry, for example the following one:

```
aligned(8) class GPCCParameterSetInfoEntry extends
VolumetricVisualSampleGroupEntry ('gpss') {
    unsigned int(1) sample_type;
    unsigned int(7) reserved;
}
``` where sample_type indicates:

for example when set to 0, that a sample is either a sync sample (e.g., sample 105-1 in FIGS. 1*a* and 1*b*), a non-sync sample that contains all needed parameter sets, or a non-sync sample only requiring parameter sets from a previous sync sample or from a sample entry (e.g., sample 105-2 or 105-*n* in FIGS. 1*a* and 1*b*). This sample may only need a state-of-the-art treatment by a media reader (retrieval of some parameter sets in a sync sample or in the sample entry by the media reader); and for example when set to 1, that a sample is a non-sync sample requiring parameter sets from another non-sync sample (e.g., sample 105-*o* in FIGS. 1*a* and 1*b*). This sample needs further information for a reader (e.g., 'gpsg' box or other metadata added by the media file writer) to retrieve the needed parameter sets.

Still according to other particular embodiments, a sample may be mapped onto this type of sample group only when it needs parameter sets from another sample. In other words, a sample that is not mapped onto this type of sample group (i.e. the sample is not explicitly mapped using a 'sbgp' SampleToGroupBox or a default sample grouping, or the sample is explicitly mapped to a group_description_index=0) is either a sync sample or a self-contained sample (assuming that all samples are self-decodable).

Two different values for the sample_type may be used to distinguish self-decodable sample that needs parameter sets from another non-sync sample, from self-decodable sample that only needs parameter sets from a sync sample or sample entry. This may be indicated by a SampleGroupDescriptionBox (with the 'gpss' grouping_type), with, for example, the following entry:

```
aligned(8) class GPCCParameterSetInfoEntry extends
VolumetricVisualSampleGroupEntry ('gpss') {
    unsigned int(1) sample_type;
    unsigned int(7) reserved;
}
``` where sample_type indicates:

for example when set to 0, that the sample is a self-decodable sample only requiring parameter sets from a previous sync sample or from the sample entry (e.g., sample 105-2 or 105-*n* in FIGS. 1*a* and 1*b*); and for example when set to 1, that the sample is a self-decodable sample requiring parameter sets from another non-sync sample (e.g., sample 105-*o* in FIGS. 1*a* and 1*b*).

In such embodiments, the samples that are not mapped onto this sample group (or mapped onto a group_description_index=0 in this sample group) may be sync samples or self-contained samples (assuming that all samples are self-decodable).

In a variant, in the case where the bit-stream also contains non-self-decodable samples (e.g., inter-prediction samples), the non-mapped samples or the samples mapped onto group_description_index=0 may be sync samples, self-contained samples, or non-self-decodable samples.

In yet another variant, a single sample_type value (e.g. 0) is used to map a sample when it needs parameter sets from another sample.

In yet another variant, different values of the sample_type can be used to distinguish self-contained samples that are not sync samples, self-decodable samples that need parameter sets from other non-sync samples, and self-decodable samples that only need parameter sets from sync samples or the sample entry.

Figure 1:
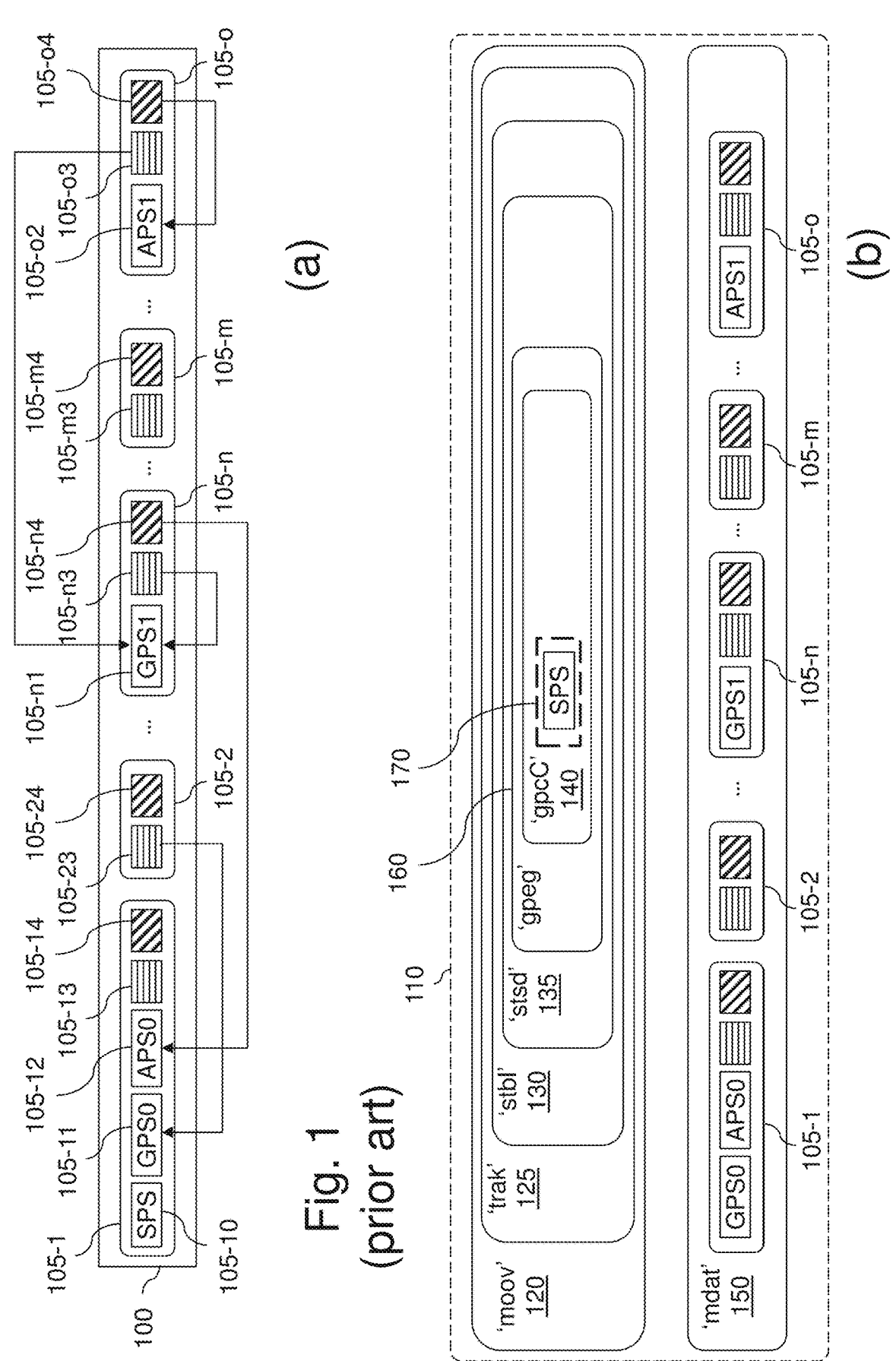
FIGS. 1a and 1b, illustrate an example of G-PCC bitstream and of a corresponding encapsulated G-PCC bitstream, respectively.

This may be indicated by a SampleGroupDescriptionBox (with 'gpss' grouping_type), for example with the following entry:

```
aligned(8) class GPCCParameterSetInfoEntry extends
VolumetricVisualSampleGroupEntry ('gpss') {
    unsigned int(2) sample_type;
    unsigned int(6) reserved;
}
``` where sample_type indicates:

for example when set to 0, that the sample is a self-contained sample that is not a sync sample;

for example when set to 1, that the sample is a self-decodable sample that only needs parameter sets from a previous sync sample or from the sample entry (e.g., sample 105-2 or 105-$n$ in FIGS. 1$a$ and 1$b$); and for example when set to 2, that the sample is a self-decodable sample that needs parameter sets from other non-sync samples (e.g., sample 105-$o$ in FIGS. 1$a$ and 1$b$).

In such a variant, samples that are not mapped onto this sample group (or mapped onto a group_description_index=0 in this sample group) may be sync samples or non-self-decodable samples.

Still according to other particular embodiments, only the samples that are for example using the following non-self-contained are signaled, SampleGroupDescriptionEntry:

```
aligned(8) class GPCCParameterSetInfoEntry extends
VolumetricVisualSampleGroupEntry ('gpss') {
    unsigned int(1) sample_type;
    unsigned int(7) reserved;
}
``` where sample_type indicates, for example when set to 0, that a sample is a non-sync sample requiring parameter sets (xPS) from other non-sync samples and/or from the last sync sample (e.g., sample 105-2, 105-$o$, or possibly sample 105-$m$ in FIGS. 1$a$ and 1$b$). This sample needs further information for a reader ('gpsg' or other metadata added by the media file writer) to retrieve the needed parameter sets.

Signaling Missing Parameter Sets

According to some particular embodiments, the media file writer may create an extension of the SampleGroupDescriptionBox box ('gpss'), as follows:

```
aligned(8) class GPCCParameterSetInfoEntry extends
VolumetricVisualSampleGroupEntry ('gpss') {
    unsigned int(1) sample_type;
    unsigned int(7) reserved;
    unsigned int(8) entry_count;
    for (int i=0; i< entry_count; i++) {
        unsigned int (4) parametersetType;
        unsigned int (4) parametersetId;
    }
}
``` where sample_type indicates, for example when set to 0, that the sample is a non-sync sample requiring parameter sets (xPS) from another non-sync sample (other than from the sample entry or from a previous sync sample), e.g., sample 105-$o$ in or, possibly, sample 105-$m$ in FIGS. 1$a$ and 1$b$). This sample needs further information for a media reader (e.g., 'gpsg' or other metadata added by the media file writer) to retrieve the needed parameter sets, entry_count specifies the number of missing parameter sets for the non-sync sample (corresponding to the size of missing_xPS list). For each element of the missing_xPS list, the description of the missing parameters (also designated in the following as "missing descriptor") is indicated by:

parametersetType that specifies the type of G-PCC parameter unit. It is set to the tlv_type of the element and parametersetId that provides the identifier of G-PCC parameter unit. It is set to the Id of the element.

It is to be noted that the parametersetId may be optional to reduce the description cost. In such a case, the sample group only signals the type of the parameter sets that are missing and the parser may have to retrieve all the parameter sets of the given type whatever the identifier is.

It is also to be noted that in this case, the parameter sample_type may also be omitted, considering that all samples mapped to this GPCCParameterSetInfoEntry are non-sync samples requiring at least one parameter set from another non-sync sample.

According to some other particular embodiments, the missing parameters may be indicated when signaling the self-contained property for all the samples (e.g., step 325 or 335 in FIG. 3), for example using the following SampleGroupDescriptionEntry:

```
aligned(8) class GPCCParameterSetInfoEntry extends
VolumetricVisualSampleGroupEntry ('gpss') {
    unsigned int(1) sample_type;
    unsigned int(7) reserved;
    if (sample_type == 1) {
        unsigned int(8) entry_count;
        for (int i=0; i< entry_count; i++) {
            unsigned int (4) parametersetType;
            unsigned int (4) parametersetId;
        }
    }
}
``` where sample_type indicates:

for example when set to 0, that the sample is either a sync sample (e.g., sample 105-1 in FIGS. 1$a$ and 1$b$), a non-sync sample that contains all needed parameter sets, or a non-sync sample only requiring parameter sets from a previous sync sample or from the sample entry (e.g., sample 105-2 or 105-$n$ in FIGS. 1$a$ and 1$b$). Such a sample may only need state-of-the-art processing by a media reader (retrieval of some parameter sets in a sync sample or in the sample entry by the media reader) and for example when set to 1, that the sample is a non-sync sample requiring parameter sets from another non-sync sample (e.g., 105-$o$ in FIGS. 1$a$ and 1$b$). This sample may need further information for a reader (e.g., 'gpsg' or other metadata added by the media file writer) to retrieve the needed parameter sets, and where missing descriptors are only added when signaling a non-sync sample requiring parameter sets from another non-sync sample.

Still according to some particular embodiments, wherein only self-decodable samples need parameter sets from other samples, missing parameter set information is signaled using the following SampleGroupDescriptionBox box (with grouping_type 'gpss'), for example with the following entry:

```
aligned(8) class GPCCParameterSetInfoEntry extends
VolumetricVisualSampleGroupEntry ('gpss') {
    unsigned int(1) sample_type;
    unsigned int(7) reserved;
    if (sample_type == 1) {
        unsigned int(8) entry_count;
        for (int i=0; i< entry_count; i++) {
            unsigned int (4) parametersetType;
            unsigned int (4) parametersetId;
        }
    }
}
``` where sample_type indicates:

for example when set to 0, that the sample is a self-decodable sample only requiring one or more parameter sets from a previous sync sample or from the sample entry (e.g., sample 105-2 or 105-n in FIGS. 1a and 1b) and for example when set to 1, that the sample is a self-decodable sample requiring parameter sets from another non-sync sample (e.g., sample 105-o in FIGS. 1a and 1b), and where missing descriptors are only added when signaling a self-decodable sample requiring parameter sets from another non-sync sample.

In such a case, a sample that is not mapped into this type of sample group (i.e., the sample is not explicitly mapped using a SampleToGroupBox box 'sbgp' or a default sample grouping, or the sample is explicitly mapped to a group_description_index==0) is either a sync sample or a self-contained sample (considering that all samples are self-decodable).

In the case according to which the bit-stream also contains non-self-decodable samples (e.g., inter-prediction samples), the non-mapped samples or the samples mapped to a group_description_index=0 may be sync samples, self-contained samples, or non-self-decodable samples.

In yet another variant, a single sample_type value (e.g., 0) is used to map a self-decodable sample when it needs parameter sets from other sample(s). It is also to be noted that in this case, the sample_type parameter may also be omitted, considering that all the samples mapped to this GPCCParameterSetInfoEntry are self-decodable samples requiring at least one parameter set from another sample.

According to another variant, different values of the sample_type can be used to distinguish:

self-contained samples that are not sync samples, self-decodable samples that need parameter sets from other non-sync samples and self-decodable samples that only need parameter sets from sync samples or the sample entry.

This may be indicated by a SampleGroupDescriptionBox box (with grouping_type 'gpss'), for example with the following entry:

```
aligned(8) class GPCCParameterSetInfoEntry extends
VolumetricVisualSampleGroupEntry ('gpss') {
    unsigned int(2) sample_type;
    unsigned int(6) reserved;
    if (sample_type != 0) {
        unsigned int(8) entry_count;
        for (int i=0; i< entry_count; i++) {
            unsigned int (4) parametersetType;
            unsigned int (4) parametersetId;
        }
    }
}
``` where sample_type indicates:

for example when set to 0, that the sample is a self-contained sample that is not a sync sample, for example when set to 1, that the sample is a self-decodable sample that only needs parameter sets from a previous sync sample or from the sample entry (e.g., sample 105-2 or 105-n in FIGS. 1a and 1b), and for example when set to 2, that the sample is a self-decodable sample that needs parameter sets from other non-sync samples (e.g., sample 105-o in FIGS. 1a and 1b). and where missing descriptors are only added when signaling a self-decodable sample requiring parameter sets from other non-sync samples and/or from the last sync sample.

Still according to some particular embodiments, missing parameter set information is indicated when signaling only samples that are non-self-contained (e.g., step 335 in FIG. 3), for example using the following SampleGroupDescriptionEntry:

```
aligned(8) class GPCCParameterSetInfoEntry extends
VolumetricVisualSampleGroupEntry ('gpss') {
    unsigned int(1) sample_type;
    unsigned int(7) reserved;
    unsigned int(8) entry_count;
    for (int i=0; i< entry_count; i++) {
        unsigned int (4) parametersetType;
        unsigned int (4) parametersetId;
    }
}
``` where sample_type indicates:

for example when set to 0, that the sample is a non-sync sample requiring parameter sets (xPS) from other non-sync samples and/or from the last sync sample (e.g., sample 105-2, 105-o or, possibly, sample 105-m in FIGS. 1a and 1b). This sample needs further information for a media reader (e.g., 'gpsg' or other metadata added by the media file writer) to retrieve the needed parameter sets, and where missing descriptors are added for non-self-contained samples.

Still according to some particular embodiments, the missing parameter sets are signaled independently of the self-contained property, for example in a separate SampleGroupDescriptionBox box for example using grouping_type 'gpsr' (Geometry Parameter Set Required), being noted that another 4 cc code may be used), for example with the following entry:

```
aligned(8) class GPCCParameterSetInfoEntry extends
VolumetricVisualSampleGroupEntry ('gpsr') {
    unsigned int(8) entry_count;
    for (int i=0; i< entry_count; i++) {
        unsigned int (4) parametersetType;
        unsigned int (4) parametersetId;
    }
}
```

It is to be noted that for all the preceding SampleGroupDescriptionBox boxes, the parametersetId of the missing descriptor may be optional to reduce the description cost. In such a case, the sample group only signals the type of the parameter sets that are missing and the media parser may have to retrieve all the parameter sets of the given type whatever the identifier is.

Signaling Locations of Missing Parameter Sets

According to some particular embodiments, signaling the locations of the missing parameter sets uses the Sample-GroupDescriptionBox box 'gpss', for example with the following entry:

```
aligned(8) class GPCCParameterSetInfoEntry extends
VolumetricVisualSampleGroupEntry ('gpss') {
    unsigned int(1) sample_type;
    unsigned int(7) reserved;
    unsigned int(8) entry_count;
    for (int i=0; i< entry_count; i++) {
        unsigned int (4) parametersetType;
        unsigned int (4) parametersetId;
        unsigned int (32) sample_offset;
    }
}
``` where:

sample_type indicates, for example when set to 0, that the sample is a non-sync sample requiring parameter sets (xPS) from other non-sync samples (other than from the sample entry or from a previous sync sample) (e.g., sample **105-*o* or, possibly, sample 105-*m* in FIGS. 1***a* and 1*b*). This sample needs further information as described by the additional information of the box, entry_count specifies the number of missing parameter sets for the non-sync sample (corresponding to the size of the missing_xPS list). Then, for each element of the missing_xPS list, the description may comprise:

a missing descriptor comprising:

parametersetType that defines the type of the G-PCC parameter unit.

It may be set to the tlv_type of the element and parametersetId that defines the identifier of the G-PCC parameter unit.

It may be set to the Id of the element, a sample_offset indicating the offset, from the last sync sample, of the location of the non-sync sample where the missing parameter set is located. It may be set to the Offset_From_Sync value.

It is to be noted that the parametersetId may be optional to reduce the description cost. In such a case, the sample group only signals the type of the parameter sets that are missing and the parser may have to retrieve all the parameter sets of the given type whatever the identifier is.

According to some other particular embodiments, missing parameter set and location information is indicated when signaling the self-contained property for all the samples (e.g., step 325 or 335 in FIG. 3), for example using the following SampleGroupDescriptionEntry:

```
aligned(8)  class  GPCCParameterSetInfoEntry  extends
VolumetricVisualSampleGroupEntry ('gpss') {
    unsigned int(1) sample_type;
    unsigned int(7) reserved;
    if (sample_type == 1) {
        unsigned int(8) entry_count;
        for (int i=0; i< entry_count; i++) {
            unsigned int (4) parametersetType;
            unsigned int (4) parametersetId;
            unsigned int (32) sample_offset;
        }
    }
}
``` where sample_type indicates:

for example when set to 0, that the sample is either a sync sample (e.g., sample 105-1 in FIGS. 1*a* and 1*b*), a non-sync sample that contains all needed parameter sets, or a non-sync sample only requiring parameter sets from a previous sync sample or from the sample entry (e.g., sample 105-2 or **105-*n* in FIGS. 1***a* and 1*b*). This sample may only need a state-of-the-art treatment by a media reader (retrieval of some parameter sets in a sync sample or in the sample entry by the media reader), for example when set to 1, that the sample is a non-sync sample requiring parameter sets from other non-sync samples (e.g., sample **105-*o* in FIGS. 1***a* and 1*b*). This sample needs further information for a media reader (e.g., 'gpsg' or other metadata added by the media file writer) to retrieve the needed parameter sets, and where missing descriptors and sample_offset descriptions are only added when signaling a non-sync sample requiring parameter sets from other non-sync samples.

Still according to some particular embodiments, wherein only self-decodable samples that need parameter sets from other samples are mapped into the sample group, the missing parameter set and location information may be signaled using the following SampleGroupDescriptionBox box (with grouping_type 'gpss'), for example with the following entry:

```
aligned(8)  class  GPCCParameterSetInfoEntry  extends
VolumetricVisualSampleGroupEntry ('gpss') {
    unsigned int(1) sample_type;
    unsigned int(7) reserved;
    unsigned int(8) entry_count;
    for (int i=0; i< entry_count; i++) {
        unsigned int (4) parametersetType;
        unsigned int (4) parametersetId;
        unsigned int (32) sample_offset;
    }
}
``` where sample_type indicates:

for example when set to 0, that the sample is a self-decodable sample only requiring parameter sets from a previous sync sample or from the sample entry (e.g., sample 105-2 or **105-*n* in FIGS. 1***a* and 1*b*), for example when set to 1, that the sample is a self-decodable sample requiring parameter sets from other non-sync samples (e.g., sample **105-*o* in FIGS. 1***a* and 1*b*), and where missing descriptors and sample_offset descriptions are only added when signaling a self-decodable sample requiring parameter sets from other non-sync samples.

In that case, a sample that is not mapped into this type of sample group (i.e. the sample is not explicitly mapped using a SampleToGroupBox box 'sbgp' or a default sample grouping, or the sample is explicitly mapped to a group_description_index==0) is either a sync sample or a self-contained sample (considering that all samples are self-decodable).

In a variant, in a case where the bit-stream also contains non-self-decodable samples (e.g., inter-prediction samples), the non-mapped samples or the samples mapped to a group_description_index=0 may be sync samples, self-contained samples, or non-self-decodable samples.

In yet another variant, different values of the sample_type may be used to distinguish:

self-contained samples that are not sync samples, self-decodable samples that need parameter sets from other non-sync samples, and self-decodable samples that only need a parameter set from a sync sample or from the sample entry.

This may be indicated by a SampleGroupDescriptionBox box (with grouping_type 'gpss'), for example with the following entry:

```
aligned(8)   class   GPCCParameterSetInfoEntry   extends
VolumetricVisualSampleGroupEntry ('gpss') {
    unsigned int(2) sample_type;
    unsigned int(6) reserved;
    if (sample_type != 0) {
        unsigned int(8) entry_count;
        for (int i=0; i< entry_count; i++) {
            unsigned int (4) parametersetType;
            unsigned int (4) parametersetId;
            unsigned int (32) sample_offset;
        }
    }
}
``` where sample_type indicates:

for example when set to 0, that the sample is a self-contained sample that is not a sync sample, for example when set to 1, that the sample is a self-decodable sample that only needs parameter sets from a previous sync sample or from the sample entry (e.g., sample 105-2 or 105-n in FIGS. 1a and 1b), and for example when set to 2, that the sample is a self-decodable sample that needs parameter sets from other non-sync samples (e.g., sample 105-o in FIGS. 1a and 1b), and where missing descriptors and sample_offset descriptions are only added when signaling a self-decodable sample requiring parameter sets from other non-sync samples.

Still according to some particular embodiments, missing parameter set information is indicated when signaling only samples that are non-self-contained (e.g., step 335 in FIG. 3), for example using the following SampleGroupDescriptionEntry:

```
aligned(8)   class   GPCCParameterSetInfoEntry   extends
VolumetricVisualSampleGroupEntry ('gpss') {
    unsigned int(1) sample_type;
    unsigned int(7) reserved;
    unsigned int(8) entry_count;
    for (int i=0; i< entry_count; i++) {
        unsigned int (4) parametersetType;
        unsigned int (4) parametersetId;
        unsigned int (32) sample_offset;
    }
}
``` where sample_type indicates, for example when set to 0, that the sample is a non-sync sample requiring parameter sets (xPS) from other non-sync samples and/or from the last sync sample (e.g., sample 105-2, sample 105-o or, possibly, sample 105-m in FIGS. 1a and 1b). This sample needs further information for a media reader (e.g., 'gpsg' or other metadata added by the media file writer) to retrieve the needed parameter sets, and where missing descriptors and sample_offset descriptions are added for non-self-contained samples.

Still according to some particular embodiments, the missing parameter sets are signaled independently of the self-contained property, in a separate SampleGroupDescriptionBox box (with grouping_type 'gpsr'), for example with the following entry:

```
aligned(8)   class   GPCCParameterSetInfoEntry   extends
VolumetricVisualSampleGroupEntry ('gpsr') {
    unsigned int(8) entry_count;
    for (int i=0; i< entry_count; i++) {
        unsigned int (4) parametersetType;
        unsigned int (4) parametersetId;
        unsigned int (32) sample_offset;
    }
}
```

It is to be noted that for all the preceding SampleGroupDescriptionBox boxes, the parametersetId of the missing descriptor may be optional to reduce the description cost. In such a case, the sample group only signals the type of the parameter sets that are missing and the parser may have to retrieve all the parameter sets of the given type whatever the identifier is.

In another variant, the location parameters are signaled independently of the self-contained-property and of the missing parameter sets in another SampleGroupDescriptionBox box (for example using grouping_type 'gpsp' (Geometry Parameter set Sample Position), being noted that another 4 cc code may be used), wherein only the sample_offset is provided for each entry_count of the SampleGroupDescriptionBox box.

It is to be noted that for all the sample group descriptions signaling offset information, the sample_offset may be coded using different number of bits, for example using 8 bits or 16 bits. This may depend on the distance between sync samples. This may be a parameter in the settings of the writer or encapsulation module in step 300.

It is also to be noted that for all descriptions, the sample_offset is advantageously obtained from the last sync sample, reducing the number of sample descriptions indicating location of missing parameter set(s). In this case, an unsigned sample_offset is used for a description. In another embodiment, the sample_offset may use a signed field either set to:

a positive value (the value of Offset_From_Sync contained in the Map List), indicating that the offset is relative to the last sync sample, or to a negative value indicating that the offset to the sample containing required parameter set is relative to the sample mapped into the sample group description entry. This value corresponds to the difference between the Offset_From_Sync contained in the Map List and the sample_position_offset stored in the Required_xPS list.

Signaling Parameter Set Extraction Indications

According to some particular embodiments, a sample group is used to signal the location of the missing parameter sets inside the non-sync sample and/or the last sync sample, for example using the following SampleGroupDescriptionBox box entry (for example using grouping_type 'gpsl' (Geometry Parameter set Sample location), being noted that another 4 cc code may be used):

```
aligned(8)   class   GPCCParameterSetInfoEntry   extends
VolumetricVisualSampleGroupEntry ('gpsl') {
    unsigned int (32) size_xPS_samples;
}
``` where size_xPS_samples indicates (e.g., in bytes) the cumulated size of the contiguous parameter sets. This cumulated size may be obtained by adding field tlv_num_payload_bytes of each parameter set present in the xPS_Sample list.

According to some other particular embodiments, the sample group describes precisely the content of each contiguous G-PCC unit, for example with the following SampleGroupDescriptionBox 'gpsl' entry:

```
aligned(8)  class  GPCCParameterSetInfoEntry  extends
VolumetricVisualSampleGroupEntry ('gpsl') {
    unsigned int(8) entry_count;
    for (int i=0; i< entry_count; i++) {
        unsigned int (4) parametersetType;
        unsigned int (4) parametersetId;
        unsigned int (32) size_GPCC_unit;
    }
}
``` where:

entry_count specifies the number of parameter sets stored in the non-sync sample. Then, for each parameter set present in the non-sync sample, the description may comprise:

parametersetType that indicates the type of the G-PCC parameter unit. It may be set according to the tlv_type retrieved from xPS_Sample list, parametersetId that indicates the identifier of the G-PCC parameter unit. It may be set according to the Id retrieved from xPS_Sample list, and size_GPCC_unit that indicates the size of the G-PCC unit. It may be set to the tlv_num_payload_bytes value retrieved from xPS_Sample list.

It is observed that parametersetType and parametersetId may be optional parameters.

Using such a description enables the media reader to only extract some specific type of parameter sets (for example only GPS without exact extraction between GPS) or enables exact extraction of a parameter set when optional field is added. The media reader may jump from one G-PCC unit to another using the size_GPCC_unit information without any need to parse the sample (i.e., the headers and possibly the payload of each G-PCC unit).

In an alternative of such variant, the size_GPCC_unit may be replaced by an information coding the position of the G-PCC data unit in the sample that contains the parameter set (obtained from TLV_pos of xPS_Sample element of the Map list for example). This field may be named gpcc_unit_offset and may be coded using 8 bits (or more bits if G-PCC frame may contain more than 256 G-PCC units; this can be determined from a priori G-PCC bit-stream analysis or from settings of the G-PCC encoder).

Advantageously, all the previous sample group 'gpsl' may be used with both sample group 'gpsg' and 'gpss' to identify and extract the required parameter sets for a non-self-contained sample.

Still according to some particular embodiments, only self-decodable samples that need parameter sets from other samples are mapped into the sample group, this embodiment proposes an alternative for the 'gpsg' sample group, that:

use the 'gpsg' sample group to map samples that are self-contained or samples that require additional parameter sets than the ones in the sample itself or in the sample entry, use the 'gpsg' sample description entries to indicate offsets to the samples containing these required parameter sets, information on required parameter sets (type and identifier) for sampleX, and positions of the data units corresponding to parameter sets in the samples containing required parameter sets.

In other words, for mapping the samples, when using sample group description and sample to group boxes using the following GPCCParameterSetInfoEntry (with grouping_type 'gpsg'), the following applies:

when sampleX sample is not a sync sample and is intended to be used as a random access, it is constrained that sampleX should be mapped into a sample group with grouping type 'gpsg' and when sampleX sample is a sync sample or is not intended to be used as a random access, it should not be mapped into a sample group with grouping type 'gpsg' (i.e., it is unmapped for this grouping type or should have group_description_index value set to 0).

It is observed here that the grouping_type_parameter is not defined for a G-PCC parameter set sample group ('gpsg').

Such a GPCCParameterSetInfoEntry of grouping type equal to 'gpsg' should describe at least one of the SPS, GPS, and APS. This sample group describes the G-PCC parameter sets required to decode samples mapped to this SampleGroupDescriptionEntry and the information of where the required parameter set(s) are located. In that case, the GPCCParameterSetInfoEntry may be defined as follow:

```
aligned(8) class GPCCParameterSetInfoEntry( )
    extends VolumetricVisualSampleGroupEntry ('gpsg') {
    unsigned int(8) entry_count;
    for (int i=0; i < entry_count; i++) {
        unsigned int(4) parametersetType;
        unsigned int(4) parametersetId;
        unsigned int(32) sample_offset;
        unsigned int(8) gpcc_unit_offset;
    }
}
``` where entry_count specifies the number of required parameter sets to decode the sample(s) mapped to this sample group description entry. According to a particular example, the value 0 indicates that the sample is a self-contained sample, parametersetType indicates the type of the parameter set, such as SPS, GPS, and APS, needed by the sample mapped to this sample group entry as indicated in the following table:

| Parameter set type | Description |
| --- | --- |
| 0 | reserved |
| 1 | sequence parameter set |
| 2 | geometry parameter set |
| 3 | attribute parameter set |
| 4 to 255 | reserved | parametersetId indicates the identifier of the active parameter set, referred by a GDU or ADU. Alternatively, the values for the parameter set type can be those defined in ISO/IEC 23090-9. Some values not corresponding to parameter sets (e.g. GDU, ADU, etc.) would then be reserved or forbidden.

sample_offset indicates the index of the sample from the last sync sample where the indicated parameter set is contained, and gpcc_unit_offset indicates the offset (position) of the G-PCC data unit, that contains the parameter set referred by a GDU or ADU, within the sample indicated by sample_offset.

Depending on the settings of the encapsulation module (e.g., encapsulation module 220 in FIG. 2), when this sample group is used and when the parameter sets are changing over time, the parameter sets may be carried as follows:

when the G-PCC bit-stream is carried using multiple G-PCC tracks or temporal level tracks, the parameter sets information related to the samples present in that track may be signaled using the G-PCC parameter set sample group with grouping_type equal to 'gpsg'. This sample group should be used to group samples that require the parameter set(s) of the indicated type in the track. When a Sample ToGroupBox with grouping_type equal to 'gpsg' is present, an accompanying SampleGroupDescriptionBox with the same grouping type should be present and SampleToGroupBox should contain the index of the sample group description entry that the samples belong to.

when the G-PCC bit-stream is carried using multiple tile tracks or temporal level tile tracks, the parameter set sample group with a grouping_type equal to 'gpsg' should not be present in tracks with sample entry 'gpcb', 'gpeb', or 'gpt1'.

It is to be noted that the parametersetType and parametersetId may be optional as it may be considered as redundant to the gpcc_unit_offset, to find the G-PCC parameter set unit in the sample that contains the parameter set. However, it may be noted, that this information may be needed by a parser to filter and extract for example only G-PCC data units concerning geometry information.

In another variant of the previous 'gpsg', instead of describing, for each missing parameter set, information to retrieve the missing parameter (by sample_offset and gpcc_unit_offset), the GPCCParameterSetInfoEntry enumerates, for each sample that contains the missing parameters, the location and position of the required parameter sets, for example as follows:

```
aligned(8) class GPCCParameterSetInfoEntry( )
    extends VolumetricVisualSampleGroupEntry ('gpsg') {
    unsigned int(8) entry_count;
    for (int i=0; i < entry_count; i++) {
        unsigned int(32) sample_offset;
        unsigned int (8) nb_gpcc_unit_offset
        for (int j=0; j < nb_gpcc_unit_offset; j++) {
            unsigned int(4) parametersetType;
            unsigned int(4) parametersetId;
            unsigned int(8) gpcc_unit_offset;
        }
    }
}
``` where
entry_count specifies the number of samples that contain the required parameter sets to decode the sample(s) mapped to this sample group description,
nb_gpcc_unit_offset indicates the number of parameter set(s) contained in the sample, and
sample_offset, parametersetType, parametersetId, and gpcc_unit_offset have the same meanings as previous 'gpsg' sample group description.

Still according to some particular embodiments, the same sample group signals both the missing parameter sets for a sample and the parameter sets present in the sample (i.e., a single sample group is used to signal the different disclosed aspects that make it possible to improve random access), for example as follows:

```
aligned(8)   class   GPCCParameterSetInfoEntry   extends
    VolumetricVisualSampleGroupEntry ('gpss') {
    unsigned int(1) sample_type;
    unsigned int(7) reserved;
    if (sample_type == 1) {
        unsigned int(8) entry_count_needs;
        for (int i=0; i< entry_count_needs; i++) {
            unsigned int (4) parametersetType;
            unsigned int (4) parametersetId;
            unsigned int (32) sample_offset;
        }
    }
    unsigned int(8) entry_count_has_param;
    for (int i=0; i< entry_count_has_param; i++) {
        unsigned int (4) parametersetType;
        unsigned int (4) parametersetId;
        unsigned int(8) gpcc_unit_offset;
    }
}
``` where sample_type indicates:
for example when set to 0, that the sample is either a sync sample (e.g., sample 105-1 in FIGS. 1a and 1b) or a non-sync sample that contains all the needed parameter sets. This sample may only need a state-of-the-art treatment by a media reader (retrieval parameter sets in the sample entry by the media reader) and
for example when set to 1, that the sample is a non-sync sample requiring parameter sets from another non-sync sample and/or from the last sync sample (e.g., sample 105-2, sample 105-n or 105-o in FIGS. 1a and 1b). This sample needs further information for a media reader to retrieve the needed parameter sets.

The first loop with counter entry_count_needs is significant for all non-sync samples that require parameter sets and provide information about the missing parameter sets.

The second loop with counter entry_count_has_params enables for a sample to declare the parameter sets it contains.

The remaining parameters sample_offset, parametersetType, parametersetId, and gpcc_unit_offset have the same meanings as previous 'gpsg' sample group description.

Still according to some particular embodiments, SubSampleInformation box ('subs') is used to identify where a G-PCC parameter set unit is to be retrieved inside a non-sync sample, with specific value of flags to describe all the G-PCC data units in the sample.

The use of the optional 'subs' box with flags=0, in the ISO/IEC 23090-18 specification, enables a media file writer to extract all the parameter sets (not the exact set) from a non-sync sample and to provide the size and type of each of the G-PCC units. By referring to FIG. 4, this property should be memorized for all G-PCC data unit type and not only for the parameter set. The codec_specific parameters specified for these embodiments may be the following one:

```
aligned(8) class SubSampleInformationBox extends FullBox('subs',
version, flags)) {
    // Syntax of 'subs' box as defined in ISO/IEC14496-12
    // with GPCC codec_specific_parameters(32bits) as follows:
    if (flags == 0) {
        unsigned int(8) payloadType;
        if (payloadType == 4) { //attribute payload
            unsigned int(6) attrIdx;
            bit(18) reserved = 0;
```

-continued

```
      else
        bit(24) reserved = 0;
  } else ..{
    ...
    }
}
``` where:

payloadType indicates the tlv_type of the G-PCC unit in the sub-sample and attrIdx indicates the ash_attr_sps_attr_idx of the G-PCC unit containing the attribute data unit in the sub-sample, i.e., the adu_attr_parameter_set_id obtained when parsing the attribute data unit.

Advantageously, this may be used further even if the G-PCC data units are not contiguous.

In another alternative still using SubSampleInformationBox, a new value of flags is used or the syntax of the flags=0 is extended with codec_specific_parameters specified as follows:

```
aligned(8) class SubSampleInformationBox extends FullBox('subs',
  version, flags=X or 0)) {
  // Syntax of 'subs' box as defined in ISO/IEC14496-12
  // with GPCC codec_specific_parameters(32bits) as follows:
  if (flags == 0) { // or value X
    unsigned int(8) payloadType;
    if (payloadType == 4) { //attribute payload
      unsigned int(6) attrIdx;
      bit(18) reserved = 0;
    else
      if (payloadType == 0 | | payloadType == 1 | |
      payloadType == 3) { // parameter set id (SPS/GPS/APS)
        unsigned int(4) paramsetId;
        bit(20) reserved = 0;
      }
    else
      bit(24) reserved = 0;
  } else ..{
    ...
    }
}
``` where the additional paramsetId field is set to the Id value of the xPS_Sample list, that corresponds to the G-PCC parameter set unit in the sub-sample.

This may be used by a reader to extract the exact set of parameter sets from the non-sync sample.

Still according to some particular embodiments, sample group with the following SampleGroupDescriptionBox 'gpsl' entry is used to make it possible for the media reader to extract all the parameter sets in a single operation with a minimal parsing (read of the tlv_num_payload_bytes of each G-PCC unit):

```
    aligned(8)  class  GPCCParameterSetInfoEntry  extends
    VolumetricVisualSampleGroupEntry ('gpsl') {
      unsigned int (4) number_tlvs;
    }
``` where number_tlvs indicates the number of consecutive G-PCC units storing the parameter sets.

It is to be noted that for all the sample groups that contain a parametersetType in the sample group description entry, a variant may exist using the grouping_type_parameter of a SampleToGroupBox to indicate the parametersetType and removing it from the description of the entry.

Parsing Process

FIG. 5 illustrates an example of steps carried out in an ISOBMFF reader or parser to provide required parameter sets when a random access is performed from any sample of an encapsulated G-PCC bit-stream. The ISOBMFF reader or parser may be the 250 in FIG. 2, using de-encapsulation module 260 to parse the ISOBMFF file 225.

As illustrated, a first step is directed to configuring the reader (step 500). During this step it is defined how the media reader receives the media file to parse. The media file may be streamed from a remote device through a communication network such as communication network 230 in FIG. 2 or it may be read from a local or a remote storage device. In addition, the de-encapsulation module may be initialized during this step. This may be done by using items of information obtained by parsing the top-level boxes of the media file, for example the 'moov' box, the 'trak' boxes, and sample description boxes. In a case according to which the media player comprises a decoder module (e.g., decoder module 270 in FIG. 2), the decoder module may also be initialized during this step, for example using decoder configuration information from the sample description (e.g. G-PCC configuration box 'gpcC' 140 in FIGS. 1a and 1b).

It is assumed that the reader performs a random access from an initial sample referenced sampleX (step 505).

In order to make sure that all the parameter sets that are required to decode the considered sample (i.e., sampleX sample or a following sample) are provided to the decoder module, the reader first checks whether the considered sample is a self-contained sample (step 510). This may be done by reading an indication added by the media file writer having encapsulated the G-PCC bit-stream (e.g., at step 325 or 335 in FIG. 3) and/or by getting information on the sync samples from ISOBMFF metadata (e.g., using the SyncSampleBox box ('stss'), the TrackRunBox box ('trun'), or the TrackFragmentRandomAccessBox box ('tfra')).

If the considered sample is a self-contained sample, either signaled as a sync sample or not, the considered sample is provided to the decoder module to be decoded, without any further processing (step 515).

On the contrary, if the considered sample is not a self-contained sample, the missing parameter sets, if any, that the media reader must provide to the decoder module for decoding the considered sample, are determined (step 520). This may be done by reading an indication added by the media file writer having encapsulated the G-PCC bit-stream (e.g., at step 340 in FIG. 3).

Next, the location of the samples that contain the missing parameter sets, that can be one or more other non-sync samples or a previous sync sample, are determined (step 525). This may be done by reading an indication added by the media file writer having encapsulated the G-PCC bit-stream (e.g., at step 345 in FIG. 3).

Next, the G-PCC units corresponding to the missing parameter sets are extracted (step 530), more or less directly according to an indication provided by the media file writer. Indeed, this extraction may use an indication added by the media file writer having encapsulated the G-PCC bit-stream (e.g., at step 350 in FIG. 3) to retrieve the G-PCC parameter set units. After being retrieved, these G-PCC parameter set units are added to the considered sample before it is transmitted to the decoder module to be decoded (step 515).

According to particular embodiment, the media reader memorizes all the G-PCC parameter set units already contained within the processed samples since sampleX sample, as obtained from the encapsulated G-PCC bit-stream and transmitted to the decoder module, to avoid duplicating these G-PCC parameter set units in the considered sample when extracting the G-PCC units at step 530.

Next, the decoder module (e.g., decoder module 270 in FIG. 2) uses the considered sample augmented with the missing parameter sets (provided by the media reader), wherein all the parameter sets referred by any GDU or ADU are present in the sample itself or in one of the previous samples since the initial random-accessed sampleX sample.

Next, a test is carried out to determine whether all the samples of the ISOBMFF file have been processed (step 535), that is to say whether the media reader has reached the end of the sequence. If it remains at least one sample, the algorithm loops to step 510 to process the remaining samples.

According to the description, when a random access is to be done from a particular sample denoted sampleX, the file player may perform the following steps:

1. if the sample entry is 'gpe1' or 'gpc1', the file player can directly start the decoding and playback from sampleX. The necessary parameter sets for decoding sampleX and samples that follow it in decoding order are available in the sample entry,
2. otherwise, if SyncSampleBox is present and sampleX is indicated as sync sample, the file player can directly start the decoding and playback from the sampleX. The necessary parameter sets for decoding sampleX and samples that follow it in decoding order may be available either in the sample entry or in sampleX (test step 510 in FIG. 5 is positive),
3. otherwise, if parameter sets sample group boxes are present, then:
   a. if sampleX is mapped to an entry of the sample group boxes, the file player locates from information provided by the parameter sets sample group boxes the samples that contain the necessary parameter sets (i.e., SPS, GPS, and APS (e.g., step 520 in FIG. 5)) for decoding samples from sampleX. The samples that contain the necessary parameter sets may be determined as follows (e.g., step 525 in FIG. 5):
      i. when entry_count=0, the parameter sets are in the sampleX itself and/or in a sample entry (e.g. associated with the sampleX); otherwise,
      ii. when all sample_offset values are equal to 0, the needed parameter sets are in the sampleX itself, and/or in the last sync sample, and/or in a sample entry (e.g., associated with the sampleX and/or with the last sync sample); otherwise,
      iii. the needed parameter sets are in the sampleX itself, and/or in the last sync sample, and/or in the samples that precede sampleX since the last sync sample, and/or in a sample entry (e.g., associated with any one of those samples).
   Once those samples are located, the file parser extracts the parameter sets in those samples (e.g., step 530 in FIG. 5) and makes them available for decoding/playback starting from sampleX.
   b. if sampleX is not mapped to a group by the sample group boxes, the random access from sampleX is not specified.
4. otherwise, (i.e., the track is not 'gpe1' or 'gpc1' and no SyncSampleBox is present, and no parameter sets sample group boxes are present), random access from sampleX is not specified.

It is to be noted that when doing random access from a particular sampleX sample mapped to a G-PCC parameter set sample group entry, the file parser/player identifies the preceding sync sample and/or samples that precede the random-access starting point sampleX indicated as containing parameter set(s) required for sampleX. Then, the file parser/player extracts those parameter sets so that they can be included in the sampleX prior to sending it for decoding.

Samples Mapping Policy

In order to reduce the cost of the description to provide random access when encapsulating a G-PCC bit-stream, different policies to map the samples to a sample group providing parameter set information may be used. The number of samples to describe may vary according to the sample mapping policy that is used.

According to a first sample mapping policy, it is assumed that all the samples are self-decodable and thus, that all the samples are random accessible. This first mapping policy redefines the way metadata structure (e.g. parameter set sample group) is used at encapsulation time (possibly in some steps between steps 320 to 350 in FIG. 3) and at parsing time (steps 520 to 530 in FIG. 5). The metadata structure to provide parameter set information may be the 'gpsg' sample group, possibly with modification of the sample group description entries. In this first mapping policy, samples mapped into a 'gpsg' sample group are all samples that require parameter sets that are not in the preceding sync sample and that are not in the sample entry. The unmapped samples correspond to sync samples, self-contained samples, or samples that do not require other parameter sets than the ones in the sample itself, in the preceding sync sample or in the sample entry. Unmapped samples may be signaled in the SampleToGroupBox (with grouping_type='gpsg') by using the group_description_index=0 or they may not be listed in the sbgp (if there is no default_group_description_index value from 0 in the associated SampleGroupDescriptionBox). This makes the step 325 in FIG. 3 optional.

According to this first sample mapping policy, a G-PCC parameter set sample group description entry defines the parameter set information for any sample that refers to parameter sets that are not contained in the sample itself, not contained in the preceding sync sample, and not contained in its sample entry. The number of parameters in a G-PCC parameter set sample group description entry may be reduced by removing the parametersetType and parametersetId syntax elements, that were more indicative and by possibly removing the gpcc_unit_offset, unless it is needed to keep enough information for parsers to easily extract the exact set of required parameter sets.

During the encapsulation process (e.g., as described with reference to FIGS. 3 and 4) and according to this first sample mapping policy, the following rules may be performed, where sampleX refers to the current sample to add in the ISO Base Media file.

When a sample group description box with grouping_type equal to 'gpsg' is present, the following may apply:
   when sample sampleX is not a sync sample, a self-contained sample, or a sample that requires other parameter sets than all of those in the sample itself, in the preceding sync sample, and/or in the sample entry, it is constrained that sampleX is mapped into a sample group with grouping type 'gpsg',
   when sample sampleX is a sync sample, a self-contained sample, or a sample that does not require other parameter sets than all of those in the sample itself, in the preceding sync sample, and/or in the sample entry, it is not mapped into a sample group with grouping type 'gpsg' (i.e., it is unmapped for this grouping type by a SampleToGroupBox 'sbgp' with same grouping type and there is no default_group_description_index>0 for this grouping type).

The grouping_type parameter may not be defined for a G-PCC parameter set sample group.

A SampleGroupDescriptionEntry of grouping_type equal to 'gpsg' describes where the G-PCC parameter sets required to decode samples mapped into this SampleGroupDescriptionEntry can be found.

Moreover, regarding the different types of G-PCC encapsulation, the following rules are defined for this first sample mapping policy:

this sample group is not present in 'gpc1' or 'gpe1' tracks because it is useless since all the parameter sets are in the sample entry, this sample group may be present in 'gpcg' or 'gpeg' tracks or in temporal level tracks, and when the G-PCC bit-stream is carried using multiple tile tracks or temporal level tile tracks, this sample group may be present in 'gpcb' or 'gpeb' tracks and should not be present in 'gpt1' tracks.

According to this embodiment, a SampleGroupDescriptionEntry is for example defined with the following structure:

```
aligned(8) class GPCCParameterSetInfoEntry( )
    extends VolumetricVisualSampleGroupEntry ('gpsg') {
    unsigned int(8) entry_count;
    for (int i=0; i < entry_count; i++) {
        unsigned int(8) sample_offset;
        unsigned int (8) nb_gpcc_units
        unsigned int(8) gpcc_unit_offset[nb_gpcc_units];
    }
}
``` where:

entry_count specifies the number of required parameter sets to decode the sample(s) mapped into this sample group description entry. The value 0 indicates that the sample mapped into this sample group description entry does not require any parameter sets from previous non-sync samples, sample offset indicates the index of the sample from the last sync sample where the indicated parameter set is contained, nb_gpcc_units indicates the number of G-PCC units to retrieve in the sample located at the given sample_offset, and gpcc_unit_offset[i] indicates the offset (i.e., the position) of a G-PCC unit corresponding to a parameter set required to decode the sample mapped into this sample group description entry.

This SampleGroupDescriptionEntry allows parsers to retrieve for the samples mapped into this entry the exact set of required parameter sets to start decoding from these samples. It should be noted that in a variant for the SampleGroupDescriptionEntry, the fields nb_gpcc_units and gpcc_unit_offset[i] may be omitted (i.e., considered as optional). This variant makes it possible to reduce the size of each sample group description entry. According to this variant, parsers would obtain a superset of parameter sets required to decode the samples mapped into this entry since all parameter sets from indicated samples may be appended to the bit-stream. Other variants for the SampleGroupDescriptionEntry may even more reduce the number of parameters by providing only the sample offset of the first non-sync sample (oldest in decoding time or closer to previous sync sample) that contains a required parameter set to decode samples mapped to this entry. This requires parsers to collect all parameter sets from this first non-sync sample and following samples up to the current sample and to insert those in the reconstructed bit-stream. This variant would then cost only 8 bits (one sample_offset value) per SampleGroupDescriptionEntry.

To allow a random access from any sample (denoted sampleX) of the encapsulated G-PCC bit-stream, by providing all the required parameter sets, for example as described by reference to FIG. 5, and according to this first sample mapping policy, an ISOBMFF player may behave as follows:

1. if the sample entry of the track is 'gpe1' or 'gpc1', then the file player may directly start the decoding and playback from sampleX. Indeed, the necessary parameter sets for decoding sampleX and samples that follow it in the decoding order are available in the sample entry, 2. otherwise, if SyncSampleBox is present and sampleX is indicated as a sync sample, then the file player may directly start the decoding and playback from sampleX. Indeed, the necessary parameter sets for decoding sampleX are available either in the sample entry of the track or in sampleX, 3. otherwise, if a parameter set sample group description box is present, then:

a. if sampleX is mapped into an entry of the sample group description box then the file player locates from information provided in the sample group description entry the preceding non-sync samples that contain the required parameter sets (i.e., SPS, GPS, or APS) for decoding samples from sampleX. Once these samples are located, the file parser extracts the parameter sets in these samples and makes them available for decoding/playback starting from sampleX. These parameter sets may be combined with parameter sets from the sync sample, from the sample entry (typically the SPS), or from the sample itself, when present and b. if sampleX is not mapped into a parameter set sample group description entry, the required parameter sets are in the sample itself, in the preceding sync sample, and/or its sample entry, and 4. otherwise, (i.e., the track is not 'gpe1' or 'gpc1', no SyncSampleBox is present, and no parameter sets sample group boxes are present), random access from sampleX may not be specified.

It is to be noted that previous step 3 can be skipped for the samples following sampleX, that are mapped into the same sample group description entry, because they all share the same parameter set configuration. Carrying out step 3 for sampleX makes the required parameter sets available in the reconstructed bit-stream for these following samples mapped into the same group description entry.

To summarize this first sample mapping policy, the samples mapped into a 'gpsg' sample group are all the samples that require parameter sets that are not in preceding sync sample and not in the sample entry of the mapped samples.

According to a second sample mapping policy, that supports non-self-decodable samples that may be present in a G-PCC sequence, it is assumed that samples not mapped into the parameter set sample group are samples from which a random access is not allowed, is not possible, or is not specified. This differs from the first sample mapping policy because in the second sample mapping policy, self-contained samples have to be mapped. It is to be noted that sync samples could also be mapped but this would be redundant with their indication in the SyncSampleBox ('stss').

In this case, a G-PCC parameter set sample group description entry defines parameter set information for any sample that refers to parameter sets that are not contained in the preceding sync sample and not contained in its sample entry.

During the encapsulation process (e.g., as described with reference to FIGS. 3 and 4) and according to this second sample mapping policy, the following rules are performed where sampleX refers to the current sample to add in the ISO Base Media file.

When a sample group description box with grouping_type equal to 'gpsg' is present, the following applies:

when sample sampleX is not a sync sample and sampleX is intended to be used as a random access, sampleX is mapped into a sample group with grouping type 'gpsg' and when sample sampleX is a sync sample or when sampleX is not intended to be used as a random access, it is not mapped into a sample group with the grouping type 'gpsg' (i.e., it is unmapped for this grouping type by a SampleToGroupBox 'sbgp' with the same grouping type and there is no default_group_description_index>0 for this grouping type).

The grouping_type_parameter may not be defined for a G-PCC parameter set sample group.

A SampleGroupDescriptionEntry of grouping type equal to 'gpsg' describes where the G-PCC parameter sets required to decode samples mapped into this SampleGroupDescriptionEntry can be found.

Moreover, regarding the different types of G-PCC track encapsulation, the following rules are defined:

this sample group is not present in 'gpc1' or 'gpe1' tracks because all parameter sets are stored in the sample entries of the track, this sample group may be present in 'gpcg' or 'gpeg' tracks or in temporal level tracks, and when the G-PCC bi-tstream is carried using multiple tile tracks or temporal level tile tracks, this sample group may be present in 'gpcb' or 'gpeb' tracks and should not be present in 'gptl' tracks.

The variants of the SampleGroupDescriptionEntry used in the second sample mapping policy may be the same as or similar to the different variants described in the first sample mapping policy.

To allow a random access from any sample (denoted sampleX) of the encapsulated G-PCC bit-stream, by providing all the required parameter sets, for example as described by reference to FIG. 5, and according to this second sample mapping policy, an ISOBMFF player may behave as follows:

1. if the sample entry of the track is 'gpe1' or 'gpc1', then the file player may directly start the decoding and playback from sampleX. Indeed, the necessary parameter sets for decoding sampleX and samples that follow it in the decoding order are available in the sample entry, 2. otherwise, if SyncSampleBox is present and sampleX is indicated as a sync sample, then the file player may directly start the decoding and playback from the sampleX. Indeed, the necessary parameter sets for decoding sampleX are available either in the sample entry of the track or in sampleX, 3. otherwise, if a parameter set sample group description box is present, then:

a. if sampleX is mapped into an entry of the sample group description box then file player locates, from information provided in the sample group description entry, the preceding non-sync samples that contain the required parameter sets (i.e., SPS, GPS, or APS) for decoding samples from sampleX. The samples that contain the required parameter sets may be determined as follows:

i. when entry_count=0, the parameter sets are in sampleX itself, in the previous sync sample, and/or in its sample entry;

ii. otherwise, when entry_count>0, the parameter sets are in the preceding non-sync samples located at sample_offset after the preceding sync sample, in the previous sync sample, and/or in its sample entry;

Once these samples are located, the file parser extracts the parameter sets in these samples and makes them available for decoding/playback starting from sampleX, b. if sampleX is not mapped into a parameter set sample group, the random access from sampleX is not specified, and 4. otherwise, (i.e., the track is not of the 'gpe1' or 'gpc1' type, no SyncSampleBox is present, and no parameter sets sample group boxes are present), random access from sampleX is not specified.

To summarize this second sample mapping policy, samples mapped into a 'gpsg' sample group are all the samples that require parameter sets that are not in the preceding sync sample and that are not in the sample entry.

In a variant, applying to both the first and the second sample mapping policies, the sample group description entries for a given sample sampleX may describe a first set of parameter sets and a second set of parameter sets. The first set of parameter sets describes the required parameter sets to decode sampleX. The second set of parameter sets describes the parameter sets that are required to decode samples following sampleX up to the next sync sample and that are declared before sampleX. Then, the player has to retrieve parameter sets only for sampleX (using step 3.*a* above) and may safely decode the following samples without having to retrieve other parameter sets possibly used by the following samples (skipping step 3.*a* and ignoring the sample group description for parameter sets like 'gpsg'). This does not change the mapping of the samples for the first and second sample mapping policy in order to provide a random access. In other words, the file player uses 'gpsg' sample group entry when doing random access from a given sample and may then ignore all other 'gpsg' description provided for the following samples. In this variant, the encapsulation module may reuse the different variants of the sample group description parameters with more or less parameters like sample_offset, parameter set type or ID or indication of G-PCC units to retrieve. The first and second set may be expressed in a single loop on required parameter sets or may be declared in separate loops as in the embodiment for sync sample according to FIG. 7 or 8. A first loop declares the "past" parameter sets required for the sample from which a random access is carried out while the second loop declares the "future" parameter sets that are required for samples following the sample from which random access is carried out. This double list may be useful for parser doing fast forward on random access samples and not interested in decoding or rendering the following samples. For this usage, only the first list may be processed and the second list may be ignored.

The choice of the first or second sample mapping policy may be set as one parameter in the settings of the writer module (e.g., step 300 in FIG. 3). The parser has no other choice but to apply the policy selected by the writer. Optionally, the writer may include an indication about the sample mapping policy in use or the sample mapping policy in use may depend on the version of G-PCC bit-stream or profile. For example G-PCC v1 may implicitly use the first sample mapping policy while v2 may implicitly use the second sample mapping policy. This indication by writer may be set through a new brand value in 'ftyp' or 'ttyp' box or by specific sample entry types or a dedicated optional box for the random access mode in the sample entry.

Example of Use the Sample Mapping Policies

Figure 6:
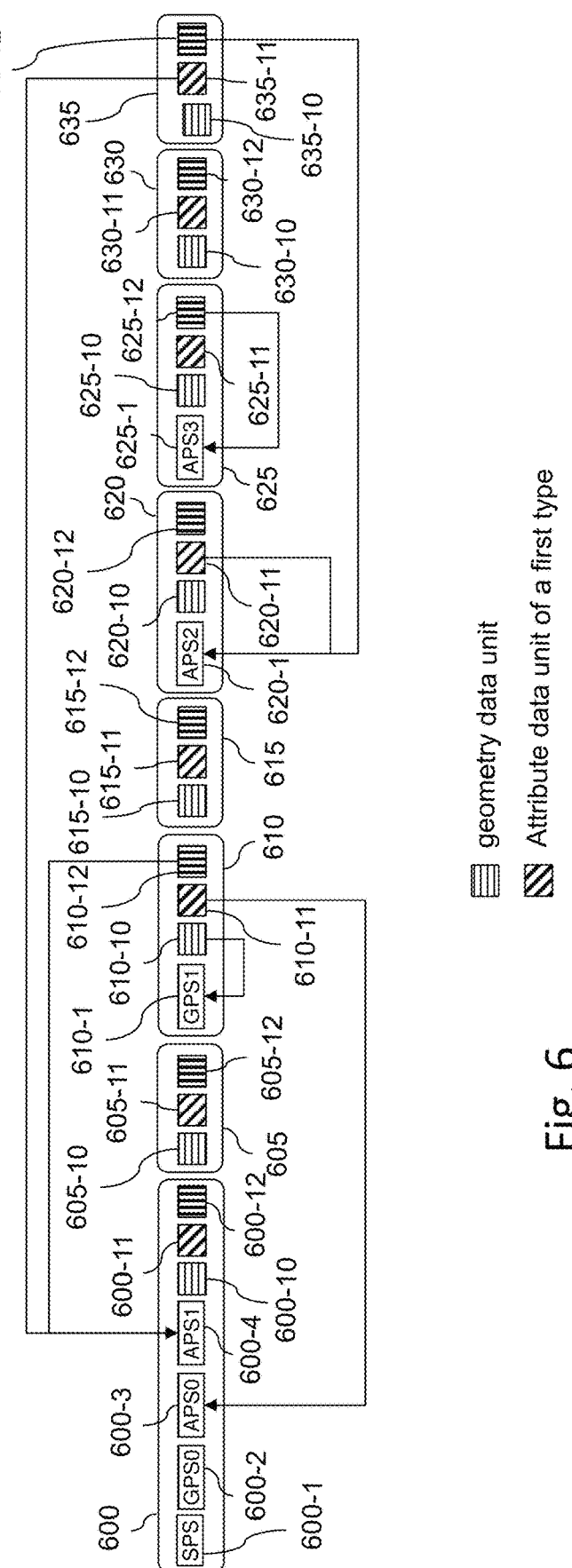
FIG. 6 illustrates an example of a G-PCC bit-stream to be encapsulated in an ISO Base Media file with a sample group for parameter sets (like a 'gpsg' sample group)

FIG. 6 illustrates an example of a G-PCC bit-stream to be encapsulated in an ISO Base Media file with a sample group for parameter sets (like a 'gpsg' sample group). This example may apply to the first or the second sample mapping policy.

For the sake of illustration, the G-PCC bit-stream comprises 8 samples (referenced 600 to 635), each containing one geometry data unit (GDUs 600-10 to 635-10) and two attribute data units (data units 600-11 to 635-11 for the first attribute and data units 600-12 to 635-12 for the second attribute).

According to this example, parameter sets used for the encoding of geometry or attribute data units are respectively:

one sequence parameter set 600-1 (SPS) used by all the samples of the G-PCC bit-stream, that is contained only in the first sample 600, a first geometry parameter set 600-2 with (GPS0 with gps_geom_parameter_set_id=0) used to describe the encoding parameters for the geometry information of two samples 600 and 605, that is contained only in sample 600, a second geometry parameter set 610-1 (GPS1 with gps_geom_parameter_set_id=1) used to describe the encoding parameters for the geometry information of the six following samples (610 to 635), that is contained only in sample 610, a first attribute parameter set 600-3 (APS0 with aps_attr_parameter_set_id=0) used to described the encoding parameters of the first attribute in the first four samples (600 to 615), that is contained only in sample 600, a second attribute parameter set 600-4 (APS1 with aps_attr_parameter_set_id=1) used to describe the encoding parameters of the second attribute in the first fifth samples (600 to 620) and of the first attribute in sample 635. APS1 is contained only in sample 600, a third attribute parameter set 620-1 (APS2 with aps_attr_parameter_set_id=2) used to describe the encoding parameters of the first attribute in the three samples (620 to 630) and of the second attribute in sample 635. APS2 is contained only in sample 620, and a fourth attribute parameter set 625-1 (APS3 with aps_attr_parameter_set_id=3) used to describe the encoding parameters of the second attribute in the two samples (625 and 630). APS3 is contained only in sample 625.

It should be noted that sample 600 is a sync sample: its parameter sets are stored either in its sample entry or in the data for the sync sample itself. Assuming for example that parameter sets of the sample 600 are stored in its sample entry, then sample 610 is a self-contained sample: it contains the geometry parameter set and is using attribute parameter sets stored in the sample entry.

According to the first sample mapping policy described above, where all samples may be randomly accessible, the ISO Base Media file encapsulating the G-PCC bit-stream depicted in FIG. 6 may contain the following sample group descriptions (for example using the syntax indicating only sample offset). The 'gpsg' SampleGroupDescriptionBox ('sgpd') would contain three entries, describing respectively:

for entry #1, a GPCCParameterSetInfoEntry with an entry_count=1 and a single sample_offset=2. This entry indicates that there is a parameter set (GPS1) in the third sample (610) of the sequence (i.e., the second after the sync sample 600), for entry #2, a GPCCParameterSetInfoEntry with an entry_count=2, a first sample_offset=2 and a second sample_offset=4. This entry indicates that there is a parameter set (GPS1) in the third sample (610) and that there is a parameter set (APS2) in the fifth sample of the sequence (620), for entry #3, a GPCCParameterSetInfoEntry with an entry_count=3, a first sample_offset=2, a second sample_offset=4, and a third sample_offset=5. This entry indicates that there is a parameter set (GPS1) in the third sample (610), that there is a parameter set (APS2) in the fifth sample of the sequence (620), and that there is a parameter set (APS3) in the sixth sample (625).

It is to be noted that other (longer) variants for sample group description entries would allow to determine the type and ID of these parameter sets and possibly to which G-PCC units in the samples at the given samples they correspond.

An example of the corresponding mapping provided by the SampleToGroupBox with grouping_type='gpsg', would then be the following:

a first entry, mapping the three first samples (600 to 610) into a group description index value 0, meaning an explicit non mapping of the samples, a second entry, mapping the two next following samples (615 and 620) into the group description index #1 (corresponding to the entry #1 of the SampleGroupDescriptionBox with grouping_type='gpsg'). It enables to retrieve the GPS1 contained in the second sample to enable the random access from any of these samples, a third entry, mapping the next following sample (625) into the group description index #2 (corresponding to the entry #2 of the SampleGroupDescriptionBox with grouping_type='gpsg'). It enables to retrieve both GPS1 and APS2 from the third and fifth sample to enable the random access from sample (625), a fourth entry, mapping the next following sample (630) into the group description index #3 (corresponding to the entry #3 of the SampleGroupDescriptionBox with grouping_type='gpsg'). It enables to retrieve GPS1, APS2 and APS3 to enable the random access from sample 630, and a last entry, mapping the last sample (635) into the group description index #2 (corresponding to the entry #2 of the SampleGroupDescriptionBox with grouping_type='gpsg'). It enables to retrieve both GPS1 and APS2 to enable the random access from sample 635.

According to the second sample mapping policy described above, assuming that random access from even samples (605, 615, 625, and 635) is not allowed or not specified, and using the variant indicating only a sample offset, the encapsulated file of the G-PCC sequence illustrated on FIG. 6 may contain the following descriptions. For the 'gpsg' SampleGroupDescriptionBox ('sgpd'), it will contain 3 entries, describing respectively:

for entry #1, a GPCCParameterSetInfoEntry with an entry_count=0, to indicate that the sample is a self-contained sample, for entry #2, a GPCCParameterSetInfoEntry with an entry_count=1 and a sample_offset=2. This entry indicates that there is a parameter set (GPS1) in the second sample after the sync sample, and For entry #3, a GPCCParameterSetInfoEntry with an entry_count=3, a first sample_offset=2, a second sample_offset=4 and a third sample_offset=5. This entry indicates that there is a parameter set (GPS1) in the third sample, that there is a parameter set (APS2) in the fifth sample of the sequence and that there is a parameter set (APS3) in the sixth sample.

The corresponding mapping provided by the SampleToGroupBox with grouping_type='gpsg', may then be the following:

1 a first entry, mapping the two first samples (600 and 605) into a group description index=0, signaling an explicit non mapping of the samples. Here, it corresponds to sync sample (600) or sample for which random access is not allowed (605). It is to be noted that as SyncSampleBox provides a description of the sync samples, parser can easily identify sync sample 600, a second entry, mapping the next sample (610) into the group description index #1 (corresponding to the entry #1 of the SampleGroupDescriptionBox with grouping_type='gpsg'). The sample is a self-contained sample, a third entry, mapping the next sample (615) into the group description index #0. Sample 615 is a sample for which random access is not allowed, a fourth entry, mapping the following sample (620) into the group description index #2 (corresponding to the entry #2 of the SampleGroupDescriptionBox with grouping_type='gpsg'). It enables to retrieve GPS1 to enable the random access from sample 620, a fifth entry, mapping the next sample (625) into the group description index #0. This sample is a sample for which random access is not allowed, a sixth entry, mapping the following sample (630) into the group description index #3 (corresponding to the entry #3 of the SampleGroupDescriptionBox with grouping_type='gpsg'). It enables to retrieve GPS1, APS2 and APS3 from samples 610, 620, and 625, respectively, to enable the random access from sample 630, and a last entry, mapping the sample (635) into the group description index #0. This sample is a sample for which random access is not allowed. It is to be noted that it could even be omitted in the SampleToGroupBox (if there is no default_group_description_index value defined or no default_group_description_index value greater than 0 in the associated SampleGroupDescriptionBox).

Using a sample group for parameter sets (e.g. gpsg or variants) makes it possible to avoid some processing at the reader's end. Indeed, each 'gpsg' description group entry provides, for a given sample sampleX, all the information to get parameter sets that are required to decode sampleX and that are located in preceding samples (between the last sync sample and sampleX). The parser does not need to analyze data unit to determine what is needed for random access or does not need to compute where to get the required parameter sets, it can just follow the description in the sample group for parameter sets.

Alternative Embodiments

FIG. 7 illustrates a second example of steps for a file writer (e.g., an ISOBMFF writer) to provide additional information in ISOBMFF metadata description, in order to enable fine random access by an ISOBMFF reader or parser;

This example is particularly adapted for encapsulating a G-PCC bit-stream in a live manner, using track fragments, for example for 'gpeg', 'gpcg', 'gpeb', or 'gpcb' tracks or to encapsulate G-PCC bit-streams in media files allowing fine random access.

Figure 8:
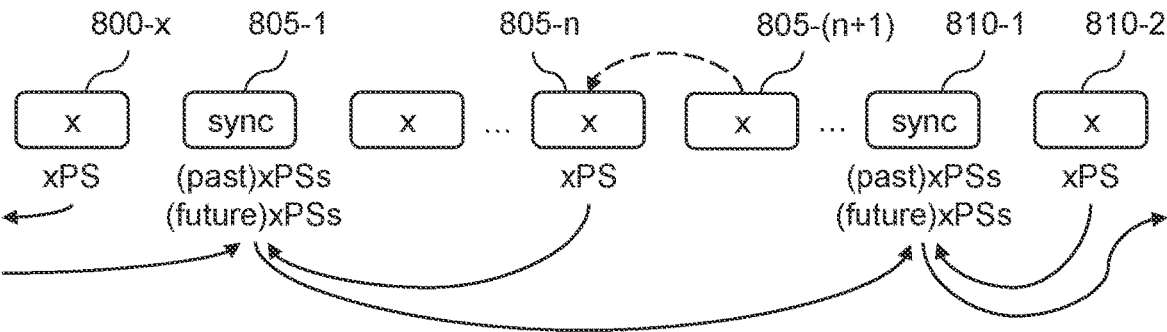
FIG. 8 is an example of a portion of a G-PCC bit-stream illustrating organization of parameter sets, according to the algorithm described by reference to FIG. 7, in order to optimize random access.

According to the example illustrated in FIG. 8, it is proposed to change the definition of a sync sample so that it contains not only the past parameter sets (occurred before this sync sample) but also the parameter sets occurring from this sync sample to the next sync sample in the G-PCC sequence. These latter parameter sets may be denoted "future" parameter sets.

Accordingly, contrary to the current sync sample definition according to which all the parameter sets that appear in a non-sync sample following a sync sample may not be stored within the sync sample (for example, if they never appeared before in the G-PCC sequence), all the parameter sets for the non-sync samples should appear in the sync samples to enable random-access from any one of the samples after a sync sample.

As illustrated in FIG. 7, a first step is directed to the configuration of the media file writer (step 700). The configuration step may comprise setting storage of the data units in single or multi-tracks, as described with reference to step 300 in FIG. 3. The configuration step may also be used to indicate whether the storage is to be performed using fragments or segments (using 'moof' boxes, being recalled that in such a case, an ISOBMFF file is organized as including one 'moov' box followed by a sequence of 'moof' and 'mdat' (or 'imda') boxes) to store short portions of the G-PCC bit-stream sequence, making it possible for a parser to process portions of the G-PCC bit-stream sequence as soon as they are stored (for example for streaming purpose). The duration or number of samples to process for a fragment (or segment) is then provided as a parameter of the media file writer. In such a case, the sample entry defined in the initial 'moov' box may not contain all the parameter sets that may be used during the G-PCC bit-stream sequence. According to this particular embodiment, the sample entry of the 'moov' box can no more be updated. Therefore, a sync sample should gather all possible parameter sets of the G-PCC sequence, as described hereafter. In this step, a variable denoted IsFirstSyncDetected is set to True.

Next, the media file writer generates the initial 'moov' box of the ISOBMFF file and generates initialization information as described with reference to step 305 in FIG. 3.

Next, a test is carried out to determine whether there is at least one further G-PCC sample to encapsulate (step 710).

In addition, it is determined whether the media file writer should generate an ISOBMFF fragment (and/or segment), for all the samples processed from the start of the algorithm or since the last fragment (and/or segment) generated. For the sake of illustration, the determination may be done by checking whether an internal variable reached the number of samples to process for a fragment (and/or segment), as set in step 700. Generating the fragment leads to storing the ISOBMFF fragment (segment) and to reinitializing a new fragment metadata description.

If at least one further G-PCC sample is to be encapsulated, another test is carried out to determine whether the considered G-PCC sample is a sync sample (step 715).

If the considered G-PCC sample is a sync sample, another test is carried out to determine whether the sync sample is the first one (step 720). This may be done by determining whether variable IsFirstSyncDetected is True.

If the considered G-PCC sample is the first sync sample, it is stored in the ISOBMFF file (step 725). This initiates a temporary metadata description of the sample indicating for example the size of the sample, the sync status of the sample (e.g., signaling the sample as a sync sample) or the G-PCC unit(s) type and size that are contained in the sample. In addition, an indication is memorized to state that the considered sample is the last sync sample of the G-PCC sequence (e.g., a reference to the considered sample is stored in the LastSyncSample variable) and the IsFirstSyncDetected variable is set to False, enabling the detection of the next sync sample as not being the first sync sample.

On the contrary, if the considered G-PCC sample is a sync sample that is not the first sync sample (i.e., the considered sample is the next determined sync sample since the LastSyncSample in the G-PCC sequence), all the previous parameter sets (the past parameter sets) are added (if not already present) to the considered sample (step 730). To that end, the content of the G-PCC parameter set data units, since the LastSyncSample sample, not present in the considered sample (i.e., the current sync sample), is added to the current sync sample. This may be done for example by comparing for each same parameter set type, the value of their determined Id (e.g., sps_seq_parameter_set_id for SPS, gps_geom_parameter_set_id and gps_seq_parameter_set_id for GPS, or aps_attr_parameter_set_id and aps_seq_parameter_set_id for APS). If the comparison for some G-PCC units differs between the considered sample and the LastSyncSample sample, the corresponding payload is added to the considered sample. Then, the considered sample is memorized as the new LastSyncSample sample and it is stored in the ISOBMFF file (step 725).

If the considered sample is not a sync sample (step 715), a test is carried out to determine whether the considered sample contains parameter set data units (step 735), which correspond to the "future" parameter sets identified since the LastSyncSample sample.

If the considered sample contains some G-PCC parameter sets data units, an optional test 740 may be carried out to determine whether the parameter set data units are contained in the payload of the LastSyncSample sample or the sample entry associated with the LastSyncSample sample. This optional test makes it possible to avoid duplication of G-PCC parameter sets. If all the G-PCC parameter set data units present in the considered sample are already contained in the LastSyncSample sample or the sample entry associated with the LastSyncSample sample, the considered sample is stored in the ISOBMFF file (step 755).

Likewise, if the considered sample does not contain any G-PCC parameter sets data unit, the considered sample is stored in the ISOBMFF file (step 755).

If the considered sample contains some G-PCC parameter sets data units and if all the G-PCC parameter set data units present in the considered sample are not already contained in the LastSyncSample sample (or if this optional test is not carried out), the payload corresponding to the "future" parameter sets is extracted from the considered sample (step 745) and added into the payload of the LastSyncSample sample (step 750). During step 750, the media file writer may store in internal variable the position where the "future" parameter sets are stored. These positions may then be added to some metadata structure of the ISOBMFF fragment, to enable discarding or not of theses parameter sets by a parser or reader during parsing. Next, the considered sample is stored in the ISOBMFF file (step 755). The metadata structure to store these positions may be for example a sample group structure containing at least a list of sample offsets, indicating which samples between this sync and the next sync sample contain a parameter set, and optionally an index of a corresponding data unit in the data of these samples.

After having stored the considered sample in the ISOBMFF file, either as a sync sample or not (step 725 or 755), the algorithm loops to step 710 to check whether there remains at least one sample to encapsulate and/or to generate a fragment of the ISOBMFF file. If it is determined that the considered sample is the last sample to be encapsulated, the generated fragment is the last fragment of the ISOBMFF file.

According to particular embodiments, parsing a G-PCC bit-stream encapsulated according to the algorithm illustrated in FIG. 7 comprises discarding the "future" parameter sets when extracting the G-PCC bit-stream. This makes it possible for a G-PCC decoder to avoid processing a parameter set several times. To achieve this, the "future" parameter sets may be indexed in the sync sample to allow easy discarding or skipping. This indexation may consist in using a metadata structure like a dedicated sample group or in extending the metadata structure describing the sync samples (e.g., 'sync' or 'sap' or 'rap' sample group description) with information allowing identification of NAL units corresponding to "future" parameter sets in the data part of the media file. In random access, the parser should determine whether to skip or not the future parameter sets when reconstructing the bit-stream. This depends on whether the reconstruction starts from a sync sample or from a non-sync sample. When starting from a sync sample, they may be discarded. On the contrary, when starting from a non-sync sample, the future parameter sets should be appended to the bit-stream before the data for the non-sync sample to start on.

According to other embodiments, parsing a G-PCC bit-stream encapsulated according to the algorithm illustrated in FIG. 7 comprises inserting the "future" parameter sets when extracting the G-PCC bit-stream so that the obtained bit-stream is compliant with ISO/IEC 23090-9 (duplicated parameter sets have the same identifier and the same payload, which is authorized). Such embodiments should be used if the media file writer does not indicate that a set of parameter sets actually corresponds to "future" parameter sets.

This new sync sample becomes a sync sample for the sync sample and its following samples until the next sync sample. This sync sample contains the parameter set(s) required to decode the sample and the following samples until the next sync sample. The required parameter sets may be stored within the data corresponding to the sync sample or in its sample entry. Typically, when the file is fragmented, a fragment may start with this new sync sample. As another example, when the file comes as segments, then the new sync sample, may be defined only at the first sample of the segment and not necessarily on each fragment. The writer may decide this considering a rate/latency trade-off.

FIG. 8 is an example of a portion of a G-PCC bit-stream illustrating organization of parameter sets, according to the algorithm described by reference to FIG. 7, in order to optimize random access.

As illustrated, the portion of a G-PCC bit-stream comprises seven samples among which two are sync samples (samples 805-1 and 810-1).

Each sync sample except the first one (not represented) comprises all the parameter sets of the previous sync sample, denoted past parameter sets (or (past) xPSs in short) and the parameter sets of the following non-sync samples, until the next sync sample, denoted future parameter sets (or (future)

xPSs in short). Accordingly, any non-sync sample may be used as a random access while using the parameter sets of its previous sync sample.

For the sale of illustration, the past parameter sets of sync sample 805-1 comprise the parameter sets comprised within non-sync sample 800-*x* (that are future parameter sets of the sync sample preceding non-sync sample 800-*x*) and the future parameter sets of sync sample 805-1 comprise the parameter sets comprised within non-sync sample 805-*n* (that are used by non-sync sample 805-(*n*+1) in this example).

Likewise, the past parameter sets of sync sample 810-1 comprise the parameter sets comprised within sync sample 805-1, in particular its past parameter sets comprised within non-sync sample 800-*x* and its future parameter sets comprised within non-sync sample 805-*n* and the future parameter sets of sync sample 810-1 comprise the parameter sets comprised within non-sync sample 810-2.

It is to be noted that the future parameter sets contained within the sync samples may comprise a reduced set of information, for example a type, a size, and an offset of the parameter sets.

Hardware for Carrying Out the Steps of Some Embodiments of the Disclosure

Figure 9:
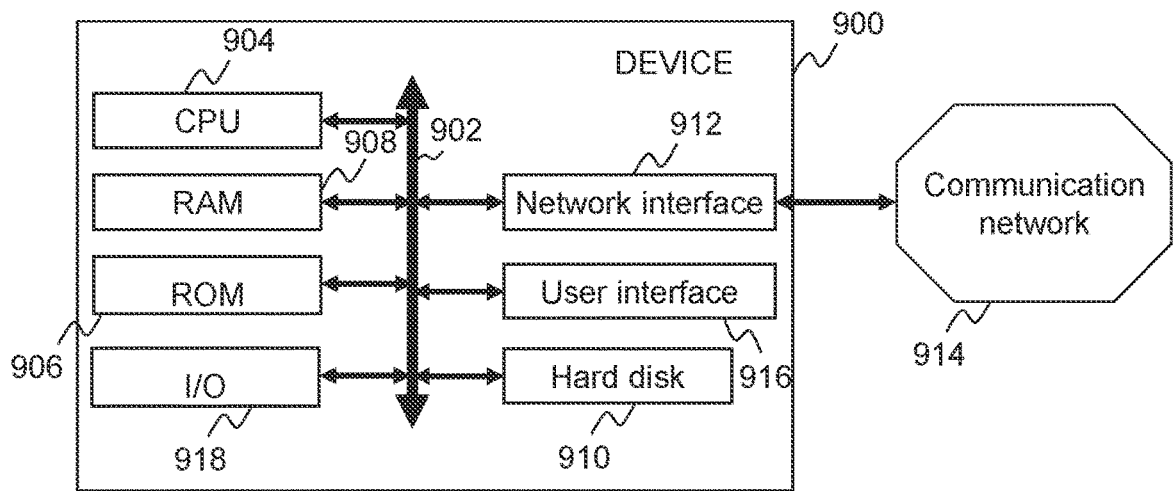
FIG. 9 is a schematic block diagram of a computing device for implementation of one or more embodiments of the disclosure.

FIG. 9 is a schematic block diagram of a computing device 900 for implementation of one or more embodiments of the disclosure. The computing device 900 may be a device such as a micro-computer, a workstation, or a light portable device. The computing device 900 comprises a communication bus 902 connected to:

a central processing unit (CPU) 904, such as a microprocessor;

a random access memory (RAM) 908 for storing the executable code of the method of embodiments of the disclosure as well as the registers adapted to record variables and parameters necessary for implementing the method for encapsulating, indexing, de-encapsulating, and/or accessing data, the memory capacity thereof can be expanded by an optional RAM connected to an expansion port for example;

a read only memory (ROM) 906 for storing computer programs for implementing embodiments of the disclosure;

a network interface 912 that is, in turn, typically connected to a communication network 914 over which digital data to be processed are transmitted or received. The network interface 912 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 904;

a user interface (UI) 916 for receiving inputs from a user or to display information to a user;

a hard disk (HD) 910; and/or an I/O module 918 for receiving/sending data from/to external devices such as a video source or display.

The executable code may be stored either in read only memory 906, on the hard disk 910 or on a removable digital medium for example such as a disk. According to a variant, the executable code of the programs can be received by means of a communication network, via the network interface 912, in order to be stored in one of the storage means of the communication device 900, such as the hard disk 910, before being executed.

The central processing unit 904 is adapted to control and direct the execution of the instructions or portions of software code of the program or programs according to embodiments of the disclosure, which instructions are stored in one of the aforementioned storage means. After powering on, the CPU 904 is capable of executing instructions from main RAM memory 908 relating to a software application after those instructions have been loaded from the program ROM 906 or the hard-disc (HD) 910 for example. Such a software application, when executed by the CPU 904, causes the steps of the flowcharts shown in the previous figures to be performed.

In this embodiment, the apparatus is a programmable apparatus which uses software to implement the method of the disclosure. However, alternatively, the method of the present disclosure may be implemented in hardware (for example, in the form of an Application Specific Integrated Circuit or ASIC).

Although the present disclosure has been described hereinabove with reference to specific embodiments, the present disclosure is not limited to the specific embodiments, and modifications will be apparent to a person skilled in the art which lie within the scope of the present disclosure.

Many further modifications and variations will suggest themselves to those versed in the art upon making reference to the foregoing illustrative embodiments, which are given by way of example only and which are not intended to limit the scope of the disclosure, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encapsulating point cloud data or volumetric data into an ISOBMFF-based media file, the point cloud data or volumetric data being organized in frames, the method comprising:

generating a track describing a sequence of samples, each sample comprising at least one frame, the sequence of samples comprising at least one sync sample and a plurality of non-sync samples, at least one non-sync sample of the plurality of non-sync samples comprising a parameter set;

generating metadata describing whether a non-sync sample of the plurality of non-sync samples requires, to be decoded, a parameter set from another non-sync sample of the plurality of non-sync samples; and encapsulating the track and the metadata in the media file.

2. The method according to claim 1, wherein the metadata indicate whether the non-sync sample is decodable without access to any other non-sync sample.

3. The method according to claim 1, wherein the metadata comprise an indication to indicate that the non-sync sample requires, to be decoded, a parameter set from the at least one sync sample.

4. The method according to claim 1, wherein the metadata comprise information for identifying the another non-sync sample, the non-sync sample requiring, to be decoded, a parameter set from the another non-sync sample.

5. The method according to claim 4, wherein the metadata comprise information for obtaining the required parameter set in the another non-sync sample.

6. The method according to claim 1, wherein the metadata further describe a parameter set required by the non-sync sample to be decoded.

7. The method according to claim 1, wherein whether the non-sync sample requires a parameter set from the another non-sync sample to be decoded is signaled in a sample group.

8. The method according to claim 1, further comprising determining whether the non-sync sample requires a parameter set from the another non-sync sample to be decoded, generating the metadata being based on the determining.

9. The method according to claim 8, wherein determining whether the non-sync sample requires a parameter set from the another non-sync sample to be decoded comprises determining a list of contained parameter sets and/or a list of required parameter sets for each non-sync sample of the plurality of non-sync samples.

10. The method according to claim 9, further comprising determining an offset from a sync sample to each non-sync sample comprising a parameter set.

11. A method of parsing a media file comprising encapsulated point cloud data or volumetric data, the media file comprising a track and metadata, the track describing a sequence of samples, each sample comprising at least one frame, the sequence of samples comprising at least one sync sample and a plurality of non-sync samples, at least one non-sync sample of the plurality of non-sync samples comprising a parameter set, the method comprising:

identifying a non-sync sample of the plurality of non-sync samples;

obtaining, from the metadata, an indication describing whether the identified non-sync sample requires, to be decoded, a parameter set from another non-sync sample of the plurality of non-sync samples; and decoding the identified non-sync sample as a function of the obtained indication.

12. The method according to claim 11, wherein the identified non-sync sample is decoded without accessing the another non-sync sample of the plurality of non-sync samples if the obtained indication indicates that the identi-fied non-sync sample does not require, to be decoded, a parameter set from the another non-sync sample.

13. The method according to claim 11, further comprising identifying, from the metadata, the another non-sync sample, the identified non-sync sample requiring, to be decoded, a parameter set from the another non-sync sample.

14. The method according to claim 13, further comprising obtaining information, from the metadata, to obtain the required parameter set in the identified another non-sync sample.

15. The method according to claim 11, further comprising identifying a parameter set required by the identified non-sync sample to be decoded.

16. A method of encapsulating point cloud data or volumetric data into an ISOBMFF-based media file, the point cloud data or volumetric data being organized in frames, the method comprising:

generating a track describing a sequence of samples, each sample comprising at least one frame, the sequence of samples comprising at least one sync sample followed by a plurality of non-sync samples, at least one of the non-sync samples comprising a parameter set;

generating metadata describing the parameter set of the at least one non-sync sample, the generated metadata being associated with the at least one sync sample; and, encapsulating the track and the metadata in the media file.

17. The method according to claim 16, wherein the metadata comprise a type of the parameter set of the at least one non-sync sample, an identifier of the parameter set of the at least one non-sync sample, and/or an offset to access the parameter set of the at least one non-sync sample.

18. The method according to claim 16, further comprising copying the parameter set of the at least one non-sync sample in the at least one sync sample.

19. A non-transitory computer-readable storage medium storing instructions of a computer program for implementing each of the steps of the method according to claim 1.

20. A device comprising a processing unit configured for carrying out each of the steps of the method according to claim 1.

* * * * *